United States Patent
Lewis et al.

(10) Patent No.: US 11,769,740 B2
(45) Date of Patent: Sep. 26, 2023

(54) DETECTION OF LASER-BASED SECURITY ATTACKS

(71) Applicant: QUALCOMM Incorporated, San Diego, CA (US)

(72) Inventors: Alan Lewis, Sunnyvale, CA (US); Zhengming Fu, Austin, TX (US); Nan Chen, San Diego, CA (US); Adam Polak, San Diego, CA (US); Laura Fuentes, San Diego, CA (US); Gregory Bullard, La Mesa, CA (US); Mark Todorovich, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 17/494,747

(22) Filed: Oct. 5, 2021

(65) Prior Publication Data
US 2022/0238460 A1    Jul. 28, 2022

Related U.S. Application Data

(62) Division of application No. 16/359,319, filed on Mar. 20, 2019, now Pat. No. 11,145,608.

(51) Int. Cl.
*H01L 23/00* (2006.01)
*H01L 27/144* (2006.01)
*G06F 21/75* (2013.01)

(52) U.S. Cl.
CPC .......... *H01L 23/576* (2013.01); *G06F 21/755* (2017.08); *H01L 27/1443* (2013.01)

(58) Field of Classification Search
CPC . H01L 23/576; H01L 27/1443; H01L 23/552; G06F 21/755; G06F 21/75; G06F 21/72; G06F 21/71; Y04S 40/20; G01J 1/4257; G01J 1/46; G01J 2001/446
See application file for complete search history.

(56) References Cited

U.S. PATENT DOCUMENTS

| | | |
|---|---|---|
| 11,145,608 B2 | 10/2021 | Lewis et al. |
| 2010/0301873 A1* | 12/2010 | Nobukata ............... H04L 9/004 356/213 |
| 2011/0193616 A1 | 8/2011 | Amanuma et al. |
| 2016/0225725 A1 | 8/2016 | Kim et al. |
| 2017/0357829 A1* | 12/2017 | Park ...................... G06F 21/86 |
| 2018/0164351 A1* | 6/2018 | Nirwan ............... H03K 5/1534 |

* cited by examiner

*Primary Examiner* — Jennifer D Bennett
(74) *Attorney, Agent, or Firm* — QUALCOMM Incorporated

(57) ABSTRACT

Various embodiments include integrated approaches to detecting attempts to breach system-level or chip-level security using photo-generated currents induced by lasers or other radiation sources. Various embodiments integrate photo-detection circuits with a secure processor or other circuit in such a manner that the response to a security attack is fast enough to prevent loss of secure or private information are described. Various embodiments include circuits capable of providing a permanent record of photocurrent detection.

6 Claims, 28 Drawing Sheets

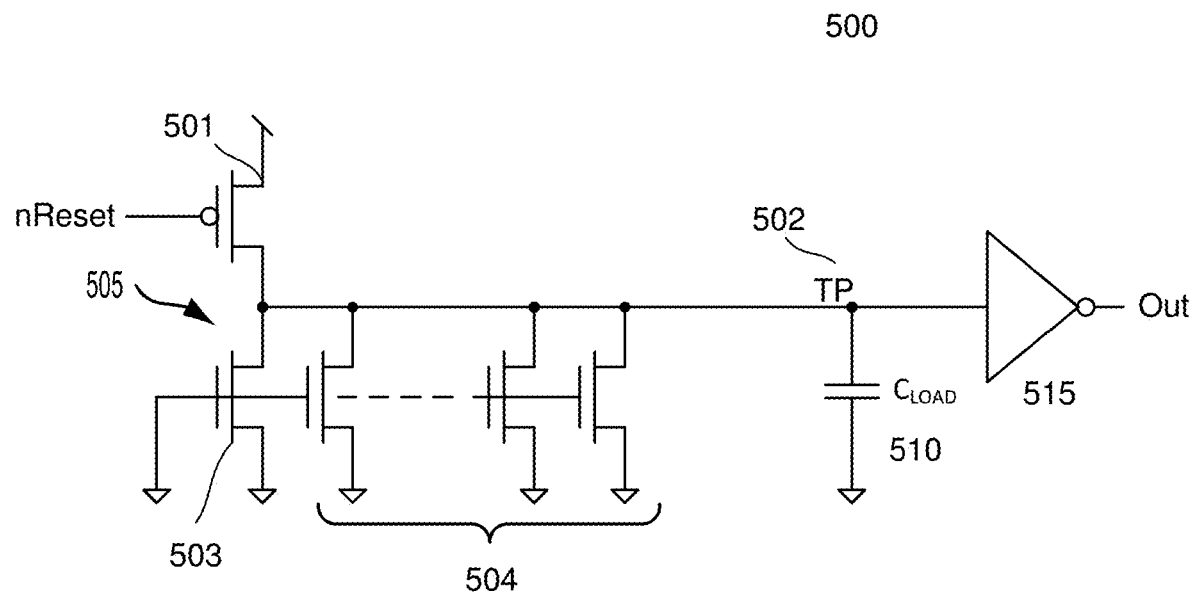
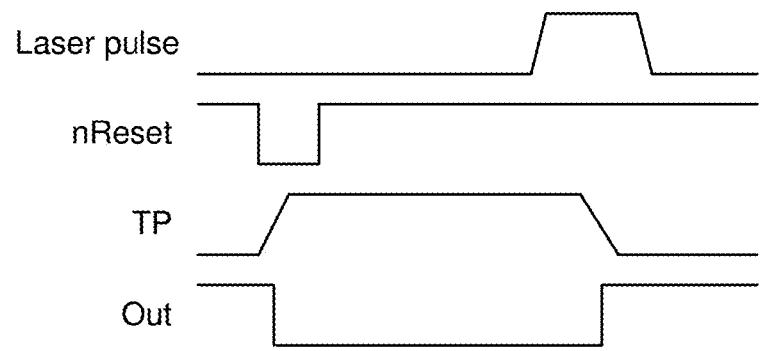
FIG. 5

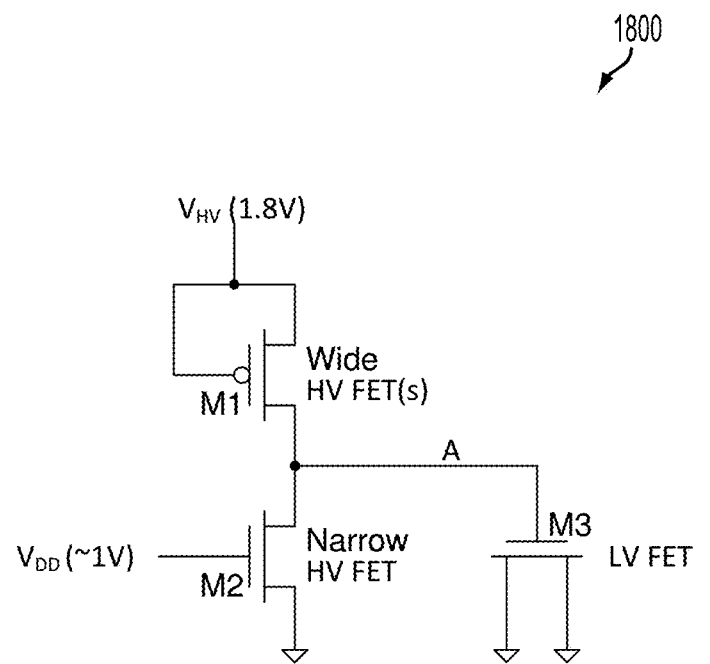
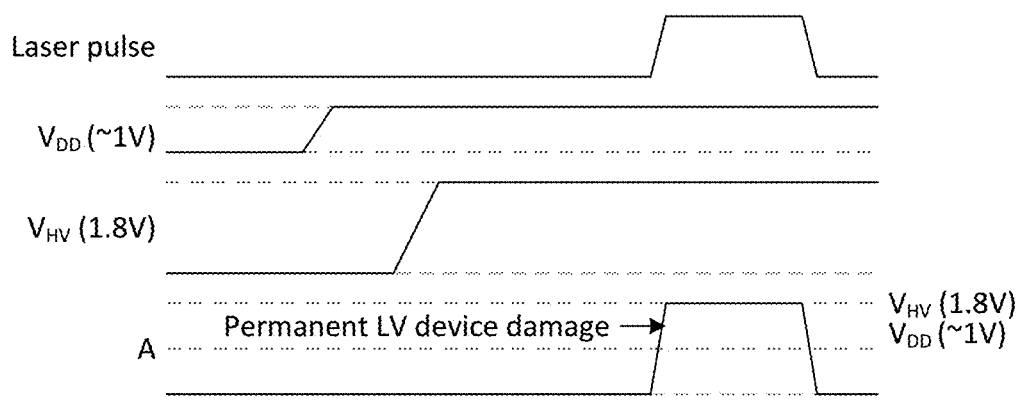
FIG. 18

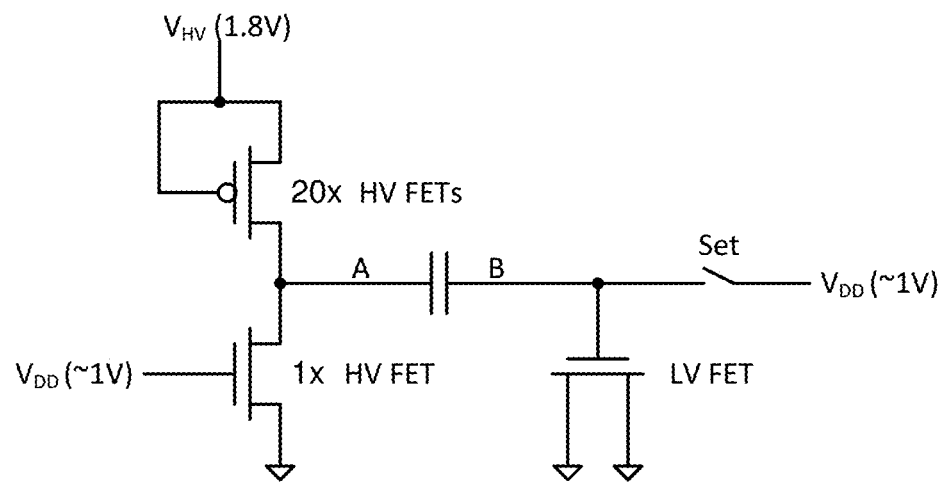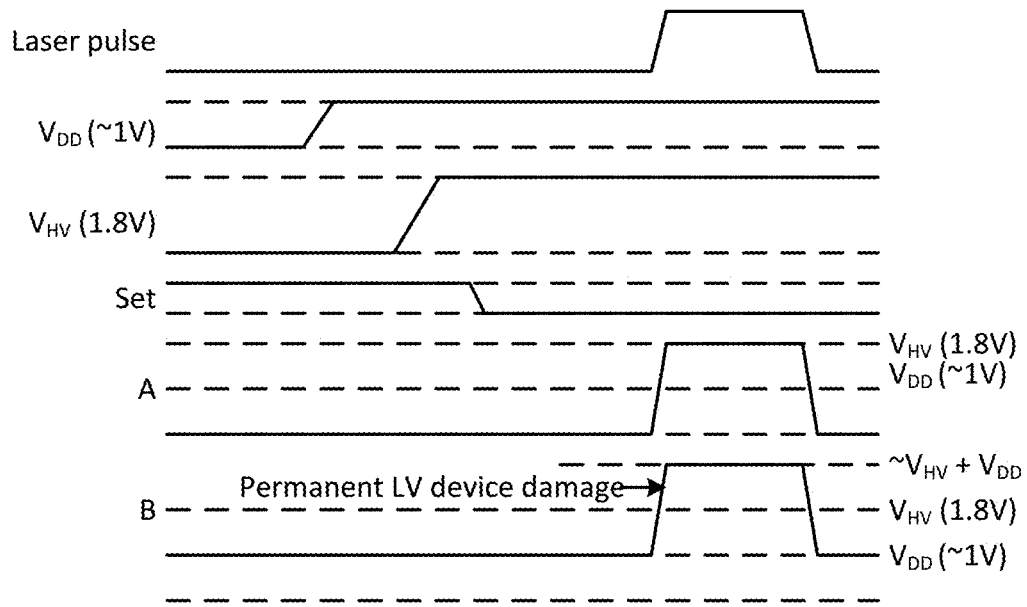
FIG. 19B

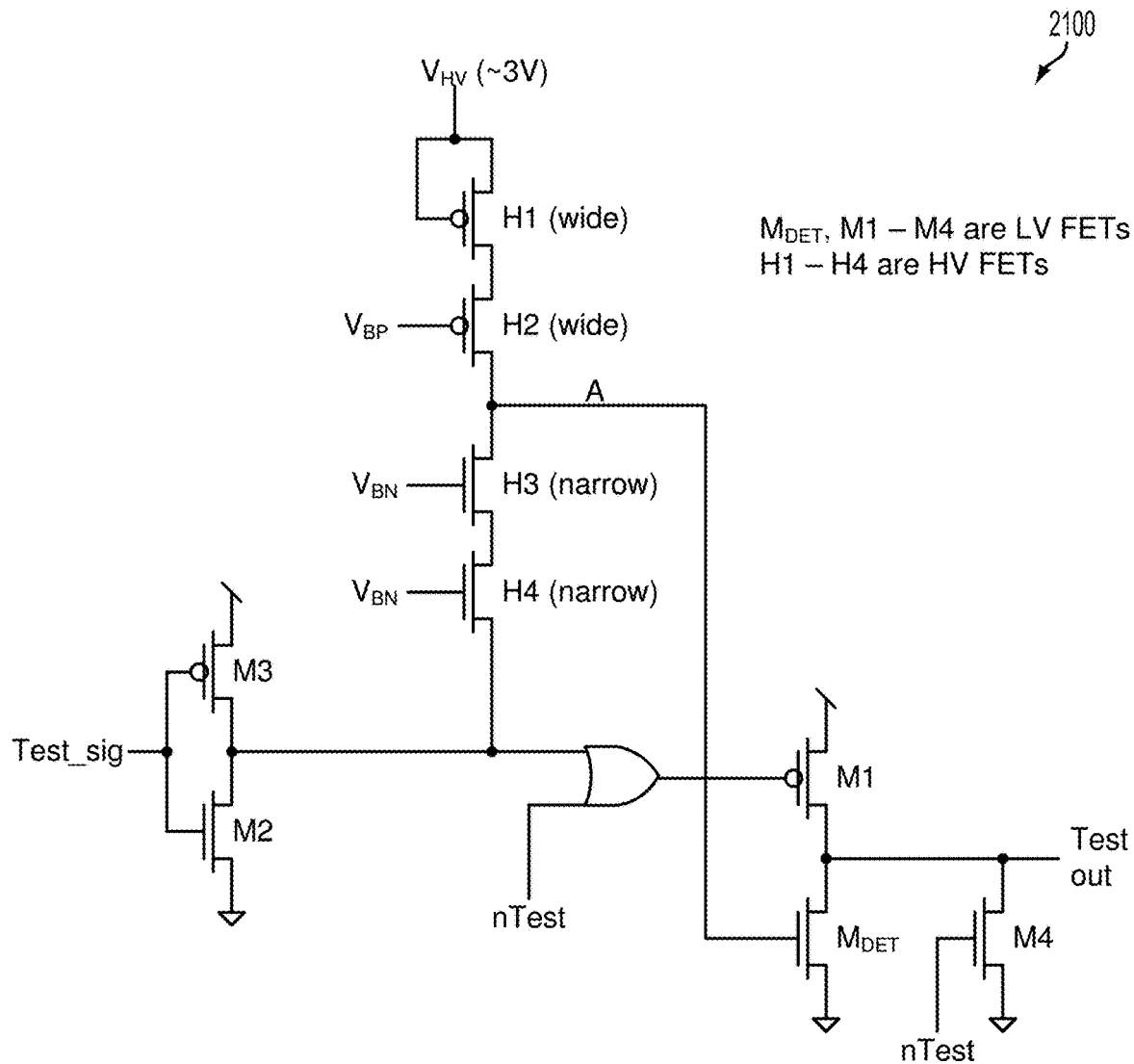
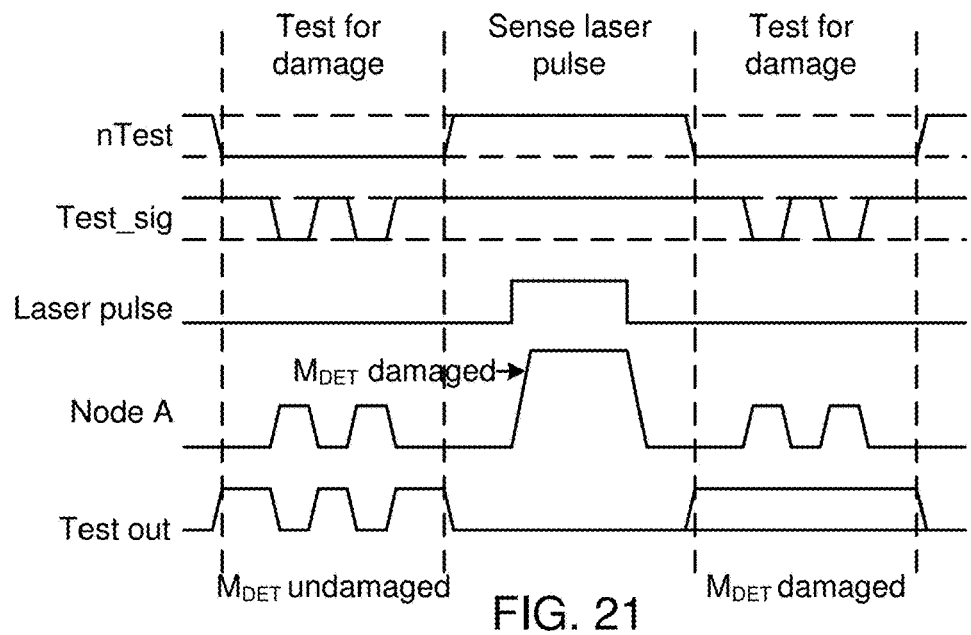
FIG. 21

US 11,769,740 B2

DETECTION OF LASER-BASED SECURITY ATTACKS

CLAIMS OF PRIORITY UNDER 35 U.S.C. § 119

The present Divisional application claims priority to application Ser. No. 16/359,319 entitled "DETECTION OF LASER-BASED SECURITY ATTACKS" filed Mar. 20, 2019.

The deliberate introduction of temporary faults in integrated circuits is commonly used to attack secure integrated circuits and systems. Pulsed lasers provide a convenient and easily controlled method for introducing such faults by creating transient currents in PN junctions or device channels through the photo-electric effect.

Several broad types of countermeasure against laser-based attacks are reported in the literature, including physical barriers (e.g. metal shields), device architectures with small sensitive volumes (e.g. fully-depleted SOI), redundancy to detect corrupted circuit operation, and detection of incident illumination on the integrated circuit (IC) that may constitute an attempted attack. The first three approaches have drawbacks. Shielding approaches may not be compatible with IC fabrication limits (such as metal density rules) or impose unacceptable circuit performance limitations. Devices with inherent low photonic sensitivity typically compromise other aspects of device performance, and in any case may be defeated by increasing incident light intensity. Redundancy, while effective, requires duplicate circuit functions, is expensive in silicon areas, and may be defeated by attacks that affect redundant paths similarly.

SUMMARY

Various embodiments include photocurrent detection circuits that may be implemented within other circuits to permit detection of a radiation-based attack. In various embodiments, a photocurrent detection circuit may include a first N-type metal-oxide-semiconductor (first NMOS) device electrically connected to a first P-type MOS (first PMOS) device to form a logic circuit, in which the first NMOS device and the first PMOS device may be configured such that a change in a logic state output of the logic circuit indicates a photocurrent induced by radiation.

In some embodiments, the logic circuit may be a complementary metal oxide semiconductor (CMOS) inverter. In some embodiments, the first NMOS device and the first PMOS device may be asymmetrically sized. In some embodiments, the first NMOS device may be larger than the first PMOS device.

In some embodiments, a drain of an additional NMOS device may be coupled to an output of the inverter and a source of the additional NMOS device may be coupled to ground. In some embodiments, a gate of the additional NMOS device may be coupled to ground. Some embodiments may include an output buffer, in which an input of the output buffer may be coupled to the drain of the additional NMOS device.

In some embodiments, the inverter, additional NMOS device and output buffer form a first photo-sensitive circuit. In various embodiments, the photocurrent detection circuit may also include a second photo-sensitive circuit which may include a second inverter formed by coupling a gate of a second NMOS device with a gate of a second PMOS device, and coupling a source of the second PMOS device to a drain of the second NMOS device to form an output of the second inverter, a second additional NMOS device. In such embodiments, a drain of the second additional NMOS device may be coupled to the output of the second inverter and a source of the second additional NMOS device may be coupled to ground, and a second output buffer. In such embodiments, an input of the second output buffer may be coupled to the drain of the second additional NMOS device. In some embodiments, the input of the second photo-sensitive circuit may be coupled to the output of the first photo-sensitive circuit.

In some embodiments, the photocurrent detection circuit may also include a third photo-sensitive circuit which may include a third inverter formed by coupling a gate of a second NMOS device with a gate of a second PMOS device, and coupling a source of the second PMOS device to a drain of the second NMOS device to form an output of the second inverter, a third additional PMOS device. In such embodiments, a source of the third additional PMOS device may be coupled to the output of the third inverter and a drain of the third additional PMOS device may be coupled to a logic high voltage, and a third output buffer, and an input of the third output buffer may be coupled to the source of the third additional PMOS device. In some embodiments, the input of the third photo-sensitive circuit may be coupled to the output of the second photo-sensitive circuit.

In some embodiments, the photocurrent detection circuit may further include a bias circuit coupled to the second photo-sensitive circuit. In some embodiments, the bias circuit may include a plurality of bias circuit NMOS devices, in which a respective gate of each of the plurality of bias circuit NMOS devices may be coupled together and further coupled to ground, a respective source of each of the plurality of bias circuit NMOS devices may be coupled together and a respective drain of each of the plurality of bias circuit NMOS devices may be coupled to ground and a current mirror comprising a pair of bias circuit PMOS devices. In such embodiments, the bias circuit may provide a DC bias current to the second photo-sensitive circuit.

In some embodiments, the photocurrent detection circuit may include a serial chain of second photo-sensitive circuits distributed across a protected circuit. In such embodiments, the bias circuit may be located remote from the second photo-sensitive circuit, a readout circuit configured to receive the output from the serial chain of second photo-sensitive circuits, and a controller coupled to the readout circuit and configured to produce an alarm when a photocurrent induced by radiation may be detected.

Some embodiments may further include an array of second photo-sensitive circuits distributed across a protected circuit in a series of consecutive rows and columns. In such embodiments, the bias circuit may be located remote from the second photo-sensitive circuit, a plurality of row latch circuits coupled to each respective row of second photo-sensitive circuits, a plurality of column latch circuits coupled to each respective column of second photo-sensitive circuits, a row readout circuit coupled to an output of each of the plurality of row latch circuits, and a column readout circuit coupled to an output of each of the plurality of column latch circuits.

In some embodiments, the photocurrent detection circuit may include a clock coupled to the input of the logic circuit and a plurality of additional NMOS devices coupled in parallel. In some embodiments, the first NMOS device, the first PMOS device and the plurality of additional NMOS devices may be symmetrically sized.

Some embodiments may further include a low voltage NMOS device coupled to an output of the logic circuit. In such embodiments, the first PMOS device may be a high voltage device and the first NMOS device may be a low voltage device, and the first PMOS device may be larger than the first NMOS device.

Some embodiments may include a capacitor coupled to the output of the logic circuit and a gate of the low voltage NMOS device.

Some embodiments may further include: a low voltage NMOS device coupled to an output of the logic circuit, in which the first PMOS device and the first NMOS device may be high voltage devices, and the first PMOS device may be larger than the first NMOS device; a second PMOS device in which a gate of the second PMOS device may be coupled to a source of the second PMOS device and the gate and the source of the second PMOS device may be coupled to high voltage, and in which the second PMOS device may be a high voltage device and may be symmetrically sized to the first PMOS device; and a second NMOS device, in which a gate of the second NMOS device may be coupled to low voltage, a source of the second NMOS device may be coupled to a drain of the first NMOS device and a drain of the second NMOS device may be coupled to ground, and in which the second NMOS device may be a high voltage device and may be symmetrically sized to the first NMOS device.

Some embodiments may also include a current limited buffer in which an output of the current limited buffer is coupled to the gate of the second PMOS device and a capacitor configured between the output of the current limited buffer and ground.

Various embodiments may include methods of detecting an incident of radiation on a photocurrent detection circuit.

In some embodiments, a method of detecting an incident of radiation on a photocurrent detection circuit includes determining whether a change in logic state of a logic circuit occurs indicating that a photocurrent is induced by radiation on a photocurrent detection circuit summarized above, and determining that the photocurrent induced by radiation exists in response to determining that a change in the logic state of the logic circuit occurred. Some embodiments may further include performing a countermeasure in response to determining that the photocurrent induced by radiation exists, wherein the countermeasure comprises disabling buffers in clock or data paths due to the photocurrent induced by radiation. Some embodiments may further include resetting the photocurrent detection circuit to pre-charge the output of the inverter to a logic high voltage, in which detecting the change in logic state of the logic circuit includes detecting a change in an output of the inverting buffer. Some embodiments may further include biasing the output of the logic circuit to a bias current such that the output of the logic circuit is a logic high voltage level in an absence of the incident of radiation.

In some embodiments, a method of detecting an incident of radiation on a photocurrent detection circuit includes providing a clock input to each of a plurality of inverter chains coupled in parallel in which each of the plurality of inverter chains comprises a chain of inverters coupled in series, determining whether there is a difference in phase between an output of the plurality of inverter chains, and detecting the incident of radiation on the photocurrent detection circuit in response to determining that there is a difference in phase between the output of the plurality of inverter chains. Some embodiments may further include phase matching the respective output of the plurality of inverter chains during a known period of non-incident radiation, which may be performed periodically by a controller over a product life of the photocurrent detection circuit.

In some embodiments, a method of detecting an incident of radiation on a photocurrent detection circuit includes detecting damage to a low voltage NMOS device, detecting the incident of radiation on a photocurrent detection circuit in response to detecting damage to the low voltage NMOS device. In such embodiments, a gate of the low voltage NMOS device may be coupled to an output of a logic circuit, the logic circuit may include a first PMOS device and a first NMOS device, the first PMOS device may be a high voltage device and the first NMOS device is a low voltage device, and the first PMOS device may be larger than the first NMOS device.

BRIEF DESCRIPTION OF THE DRAWINGS

The accompanying drawings, which are incorporated herein and constitute part of this specification, illustrate example aspects of various embodiments, and together with the general description given above and the detailed description given below, serve to explain the features of the claims.

FIG. 5 is a component block diagram illustrating an example dynamic photo detection circuit according to various embodiments.

FIG. 18 is a component block diagram illustrating an example simplified scheme for permanently recording laser pulse attack according to various embodiments.

FIGS. 19A and 19B are component block diagrams illustrating examples of permanently recording laser pulse attacks using increased device damage voltage according to various embodiments.

FIG. 21 is a component block diagram illustrating an example laser sensor circuit with field effect transistor (FET) damage detection according to various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods and circuits for detecting the presence of currents induced by incident light or other radiation capable of inducing electron-hole pairs in silicon.

Figure 1:
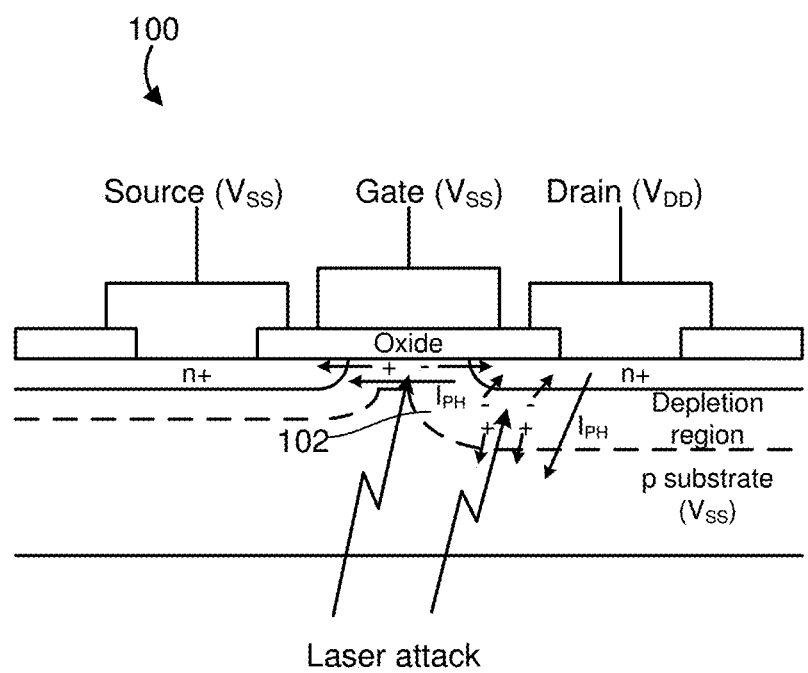
FIG. 1 is a simplified device cross-section illustrating an example of current induced by incident electromagnetic radiation.

Temporary circuit upsets can be caused by such currents induced in silicon circuits due to exposure to radiation, particularly electromagnetic radiation including infrared light, visible light, ultraviolet light, X-rays and gamma rays. For example, photons of electromagnetic radiation having an energy greater than the semiconductor band gap (i.e., wavelengths in the near IR and shorter) generate electron-hole pairs in silicon (Si) and other semiconductor materials due to the photoelectric effect. In bulk material, in the absence of electric fields, these carriers re-combine and no net current flows. However, if the electron-hole pairs are created within a depletion region, for example, around the source or drain junctions of a metal-oxide-semiconductor field-effect transistor (MOSFET) or in the gate-induced depletion region adjacent to the channel, then the electric field associated with the depletion region may separate the carriers before recombination, resulting in an externally detectable drift current. Electron-hole pairs induced outside a depletion region may also lead to an external current if they migrate to the depletion region through diffusion. For example, FIG. 1 illustrates currents $I_{PH}$ 102 generated in the drain channel regions of an n-channel MOSFET 100. Since the photoelectric effect is a common cause of electron-hole pairs that can result in such currents, such radiation-induced currents are referred to herein as "photocurrents."

One form of security attack on processors and memory devices involves exposing circuits to radiation capable of inducing electron-hole pairs in the silicon. One example is shining a laser on the semiconductor material in order to generate photoelectric currents or other electrical effects that can cause an error or upset that renders the processor vulnerable. If not countered, such attacks may enable an attacker to gain access to otherwise secure data and software. While various examples of such security attacks, as well as the various embodiments, are described herein using the example of laser illumination of circuits, electron-hole pairs and resulting currents in silicon-based circuits may also be generated by other forms of radiation, including ultraviolet, X-ray and gamma ray electromagnetic radiation, and potentially particle radiation, such as beta and alpha particle radiation. Therefore, the references to lasers and laser illumination are not intended to limit the applicability or scope of the claims to such radiation sources. Further, the term "radiation" is used herein and in the claims to refer generally to any of various forms of radiation that will generate photocurrents in circuits.

Figure 2:
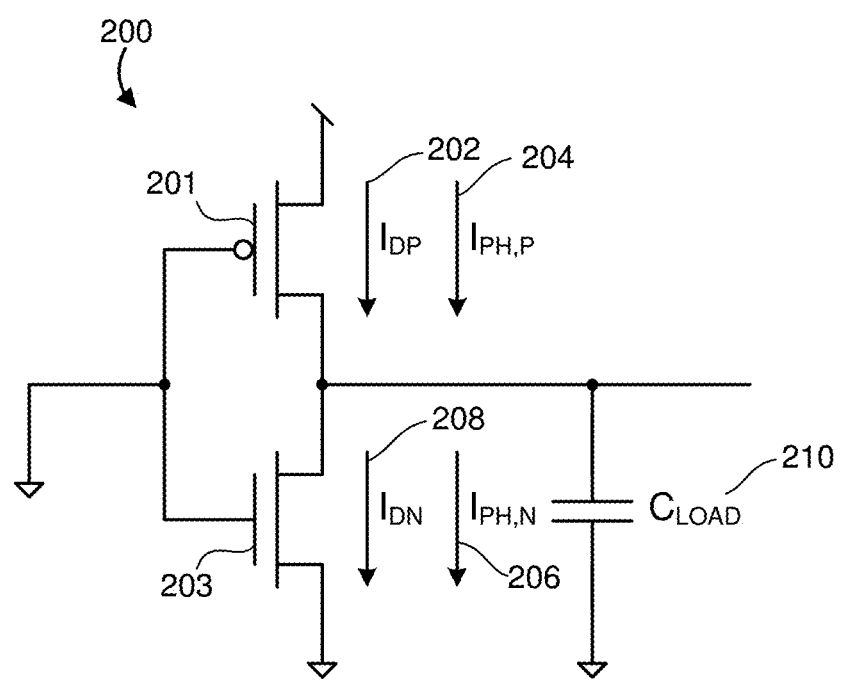
FIG. 2 is a component block diagram illustrating an example CMOS inverter with photocurrents.

FIG. 2 illustrates components of a complementary metal-oxide-semiconductor (CMOS) inverter 200 comprising a PMOS device 201 and NMOS device 203. Assuming that the input to the inverter 200 is low, the output state is determined by three currents: $I_{DP}$—the p-type MOS (PMOS) drain current 202; $I_{PH,P}$—the photocurrent generated in the PMOS drain or channel depletion regions 204; the n-type MOS (NMOS) drain current 208; and $I_{PH,N}$—the photocurrent generated in the n-type MOS (NMOS) drain or channel depletion regions 206. It may be assumed that the drain current of the off-state NMOS field-effect transistor (FET) ($I_{DN}$) 208 is negligible. The net current charging or discharging the output capacitance 210, $C_{LOAD}$, is:

$$I_{OUT}=I_{DP}+I_{PH,P}-I_{PH,N} \quad (1)$$

Normally, $I_{PH,P}=I_{PH,N}=0$ and the output capacitance is simply charged by $I_{DP}$ until the output voltage approaches $V_{DD}$ and $I_{DP}$ drops to 0, unless something acts to pull the output down.

If the photo-generated current flowing from the output to ground ($I_{PH,N}$) 206 is large enough, then the output can be pulled low. The required condition is:

$$I_{PH,N}>I_{DP}+I_{PH,P} \quad (2)$$

Similarly, if the input to the inverter is high, then the output can be pulled to the incorrect state (high) if:

$$I_{PH,P}>I_{DN}+I_{PH,N} \quad (3)$$

Figure 3:
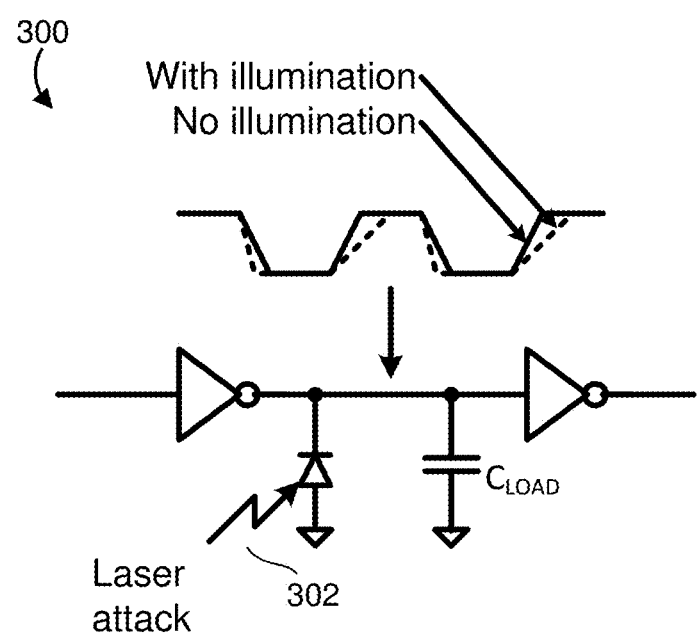
FIG. 3 is a component block diagram illustrating an example of inverter transition times with photocurrent.

The example above illustrates how the static bit at the output of a gate may be corrupted by incident illumination. Faults may also be introduced, potentially at lower incident illumination levels, if the gate is switching. FIG. 3 illustrates inverter transition times of a circuit 300 with photocurrent 302. In this case, $I_{PH,N}$ may be assumed to dominate for the sake of illustration. The photocurrent is not large enough to prevent the output switching, but the extra pull-down current reduces the fall time at the output of the inverter (gate or other sub-circuit) and increases the rise time. Thus, setup or hold time violations may be introduced, corrupting data, at illumination levels that do not cause static bits to flip.

The mechanisms described above may be induced by relatively small radiation sources, such as a laser spot, affecting a small number of devices or gates and having little or no detectable effect on the power supply. Larger laser spots might produce faults in many gates affecting a larger fraction of the overall circuit and be detected in the same manner. However, it is possible for a large area but low intensity laser spot to induce widespread photocurrents that are insufficient to disrupt the operation of individual gates directly but may induce faulty operation by causing a droop in the power supply.

Various embodiments include circuits that may be used to detect currents induced by a radiation source, such as a laser, in such a way that protection against security breaches can be implemented. The detection circuits of various embodiments are sensitive to the same range of wavelengths as the circuitry they are protecting by leveraging a physical mechanism in detection circuits that is the same as the physical mechanism that could be exploited to induce faults in such a security attack. The detection circuits of various embodiments are at least as sensitive to radiation (e.g., electromagnetic radiation), and ideally more sensitive than, the protected circuit. The detection circuits of various embodiments respond to external stimulus in a predictable manner. Further, the detection circuits of various embodiments produce a non-volatile result, such as a detection flag, that is not lost when power is turned off, such as in a power cycle.

As discussed above, causing a logic state at an inverter or gate output to flip by photocurrent may require a significant imbalance between the photocurrents induced in the first NMOS device and the first PMOS device. In principle, this may be achieved by irradiating only one device type. However, with advanced integrated circuit (IC) nodes, even diffraction-limited laser spot sizes (~1 µm) are large compared with typical logic gate dimensions, thus restricting the incident photons to one type of device or the other is impractical. To some extent, this helps reduce the sensitivity of real circuits, but imposing a design rule to maintain a balance of photo-sensitivity between NMOS and PMOS devices to minimize overall photo-sensitivity is impractical.

Figure 4:
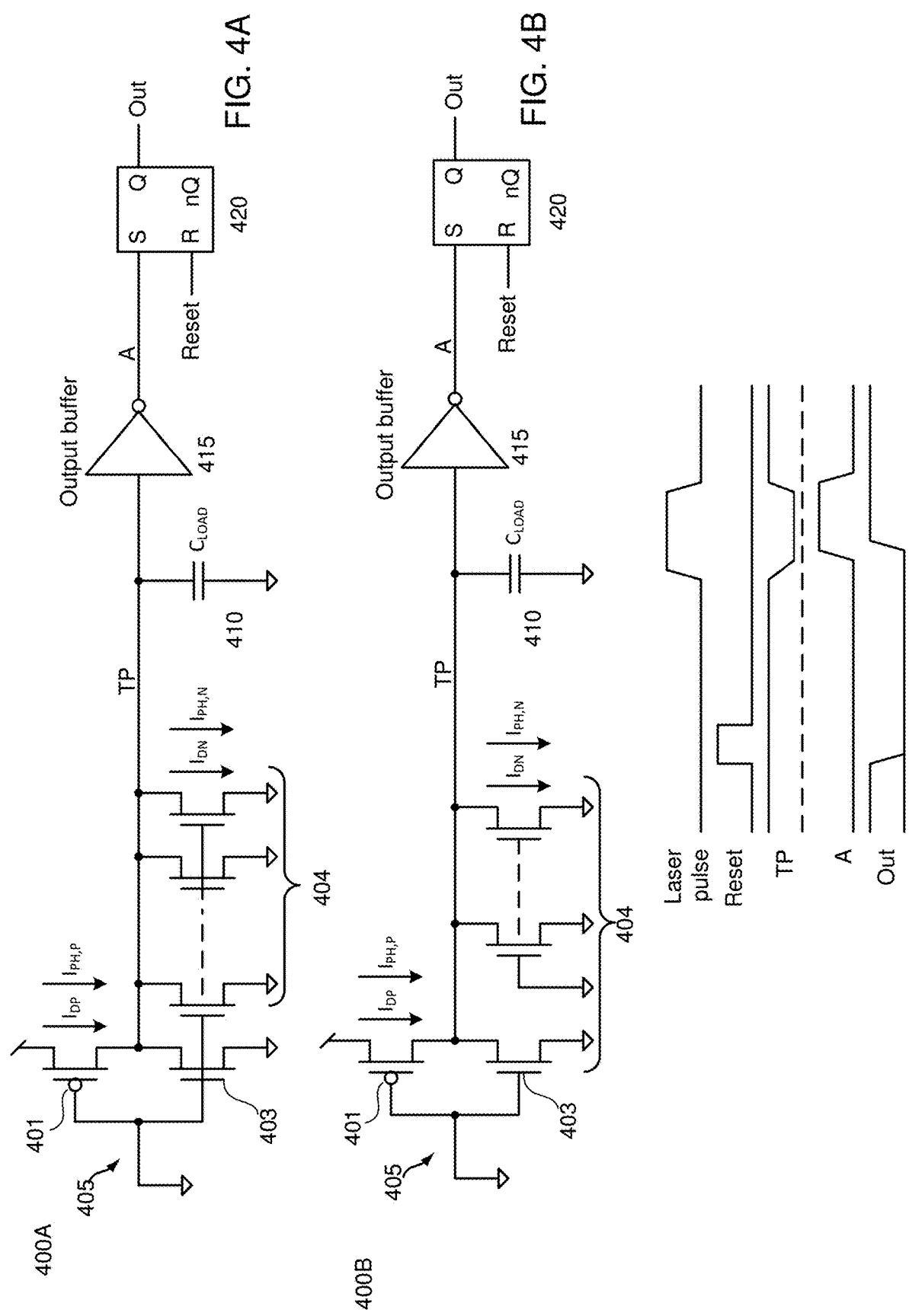
FIGS. 4A and 4B are component block diagrams illustrating a photo-sensitive inverter with buffer and latch according to various embodiments and corresponding timing diagram.

In the case of photon detectors, a large asymmetry in device sizes and junction volumes can be created to increase photo-sensitivity by creating a large imbalance between the photocurrents in the NMOS and PMOS devices. FIG. 4A illustrates a photo-sensitive circuit including an inverter with a buffer and latch. The NMOS devices are significantly larger than the PMOS devices, so any photo-generated current in the NMOS drain or channel depletion regions will dominate any photocurrent in the PMOS devices. Similar designs in which the PMOS devices are much larger than the NMOS can also be built. The NMOS device (or conversely the PMOS device) may be considered to be larger than its complementary device if it is fabricated to have a larger area resulting from a greater width, length or both as compared to the fabricated dimensions of the complementary device. Moreover, a greater number of additional devices (i.e., count of sub-devices) may contribute to the NMOS device (or conversely the PMOS device) being significantly larger than its complementary device. Thus, by adding additional NMOS (or conversely PMOS devices) the effective size of the NMOS device as compared to the size of the PMOS device (or vice versa) creates the large asymmetry.

There are three additional features of note in the circuit illustrated in FIGS. 4A and 4B as well as in various other embodiments.

First, in the circuit 400A, additional NMOS devices 404 may be included in a first photo-sensitive circuit 400A. The additional NMOS devices 404 may be used to increase photo-sensitivity of the overall first photo-sensitive circuit 400A, but also add to the input capacitance. In general, this will slow the response of the inverter, and in some applications (including those discussed below) this may slow the response time of the circuit to a photonic attack. The circuit 400B mitigates this effect by grounding the gates of the additional nFETs (NMOS devices 404) and isolating them from the input. The input capacitance remains similar to that of a simple inverter, although the output capacitance 410 is increased by the additional drain junctions and associated interconnect.

With reference to FIG. 4A and circuit 400A, the additional NMOS devices 404 may be coupled in parallel to the first NMOS device 403 of the inverter circuit. Thus, the gates of the additional NMOS device 404 may be respectively coupled together. The drain of each respective additional NMOS device 404 may be coupled to the output of the inverter 405 (including a PMOS device 401 and first NMOS device 403). The source of each respective NMOS device 403, 404 may be coupled to ground. The added NMOS device 404 increases the sensitivity of the photocurrent detection circuit by pulling the output of the logic circuit to ground if any of the additional NMOS devices 403 are radiated. In an alternative embodiment shown in the circuit 400B of FIG. 4B, the gates of each respective additional NMOS device 404 may be coupled to ground. By coupling the gates of the respective additional NMOS devices 404, the current that runs through each additional NMOS device 404 will only be due to the generated photocurrent due to incident laser light. Thus, the detection of the incident light may be achieved without the potential delay that might be caused by coupling all of the gates of the additional NMOS devices 404 as shown in FIG. 4A. Second, the circuits 400A and 400B illustrated in FIGS. 4A and 4B show simple output buffers 415 driving nodes A. An input of the output buffer 415 may be coupled to the output of the logic circuit 420 as well as the drain of each respective additional NMOS device 404. There is a risk of shoot-through current in the output buffer 415 (which may, for example, be a simple inverter) and an indeterminate voltage at node A if the photocurrent is such that the buffer input is only partially pulled down to an intermediate voltage. If necessary, a Schmitt trigger buffer can be used to avoid this problem and ensure a clean signal at node A.

Third, the photo-sensitive circuit (400A or 400B) may return to its original state when the illumination is removed. However, a simple latch may be used to retain a flag indicating that a transient photocurrent was generated. The output of the output buffer 415 may be coupled to an input of a latch circuit 420.

The simplified analysis above applies to static circuits, and in general inducing faulty states requires that the net photo electric current seen at a node is large enough to overcome the normal on-state current of an NMOS or PMOS device in order to charge or discharge the node capacitance in the required time. In the case of dynamic circuits (including dynamic memory), with no static current source to maintain a node voltage, disturbance can be achieved with lower photocurrents. In the same way, a dynamic sensing circuit can increase the sensitivity of a photo detector.

FIG. 5 illustrates a dynamic photo-detection circuit 500 that includes an inverter logic circuit 505, wherein the logic circuit 505 may comprise a PMOS device 501 and an NMOS device 503. The dynamic photo-detection circuit 500 further includes additional NMOS devices 504, a capacitor 510 and an output buffer 515. The test point (TP) 502 is initially charged to $V_{DD}$ via the pFET (PMOS device 501) and will remain high until the charge on the node capacitance leaks away (typically over milliseconds in the absence on incident radiation) or the node is discharged by photocurrent. As with the previously described photo-sensitive circuits 200, 300, 400A and 400B, in photo-detection circuit 500, the NMOS devices 503, 504 are large compared to the PMOS device 501 to ensure that the net photocurrent pulls TP 502 towards ground. However, in this case there is no on-state PMOS channel current pulling the TP 502 node high. Thus, the test point may be pulled low by a smaller photocurrent. Consequently, fewer additional NMOS devices 504 may be used, or the number of additional NMOS devices 504 may be maintained and the sensitivity increased.

If necessary, a Schmitt trigger may be used to ensure a clean digital signal is available and avoid risk of shoot-through current.

The dynamic circuit is inherently latching—the output of the output buffer 515 remains high even after the laser pulse has passed. However, the dynamic photo-detection circuit 500 must be periodically reset (the test point charged to approximately $V_{DD}$) to avoid false triggering due to discharge of TP 502 by normal leakage.

Figure 6:
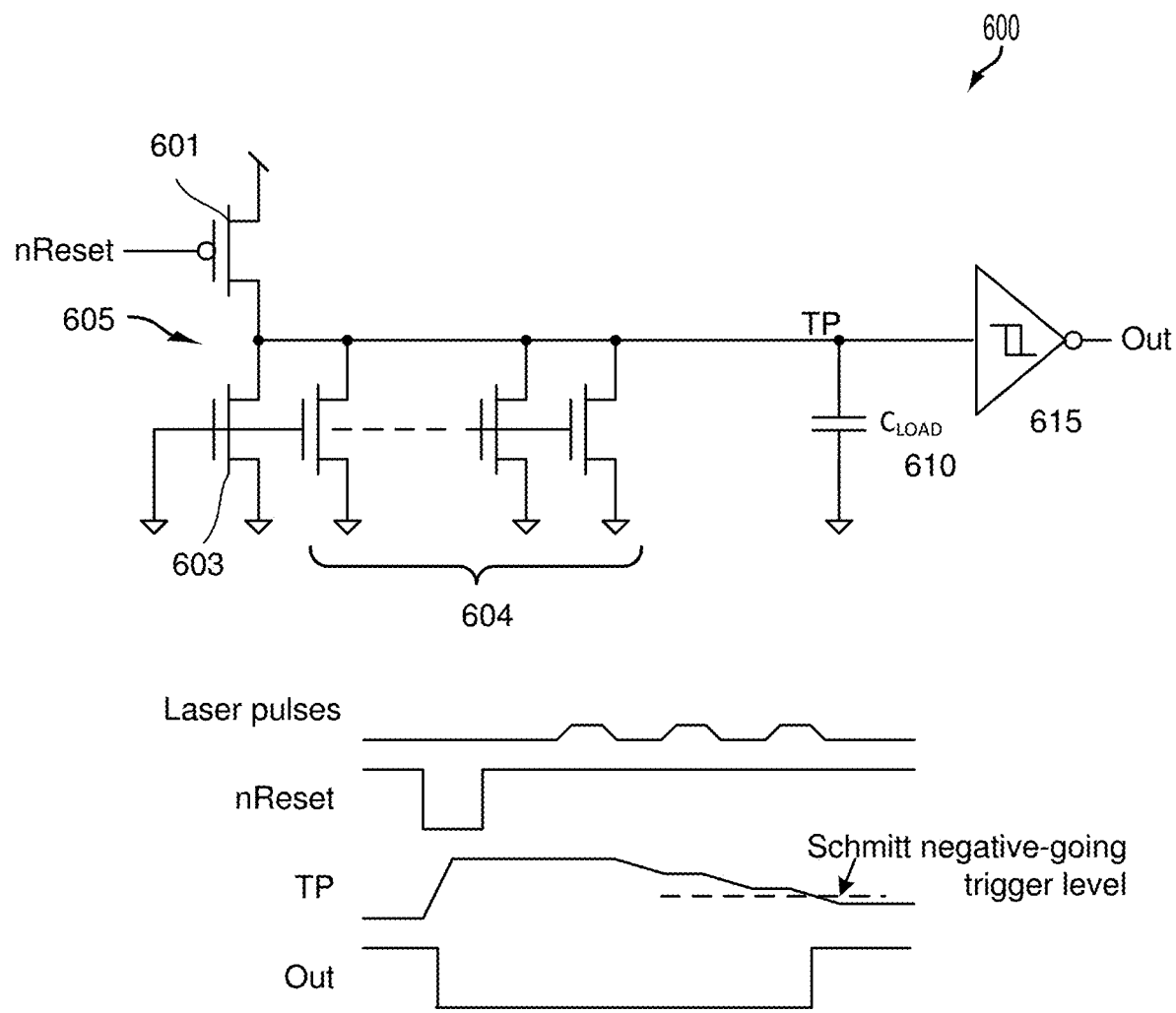
FIG. 6 is a component block diagram illustrating an example detection of a string of low-level laser pulses using a dynamic detector according to various embodiments.

One additional feature of a dynamic photo-detection circuit 600 that is not present with the static inverter detector is the ability to detect multiple low-level laser pulses. FIG. 6 illustrates a dynamic photo-detection circuit 600 that includes an inverter logic circuit 605, wherein the logic circuit 605 may include a PMOS device 601 and an NMOS device 603. The dynamic phot-detection circuit 600 further includes additional NMOS devices 604, capacitor 610 and output buffer 615. As shown in FIG. 6 and the timing diagram illustrating the operation of the dynamic photo-detection circuit 600, a succession of laser pulses, each inducing a photocurrent too small to fully discharge the test node, will eventually be detected as the cumulative effect lowers the test point (TP) voltage.

Figure 7:
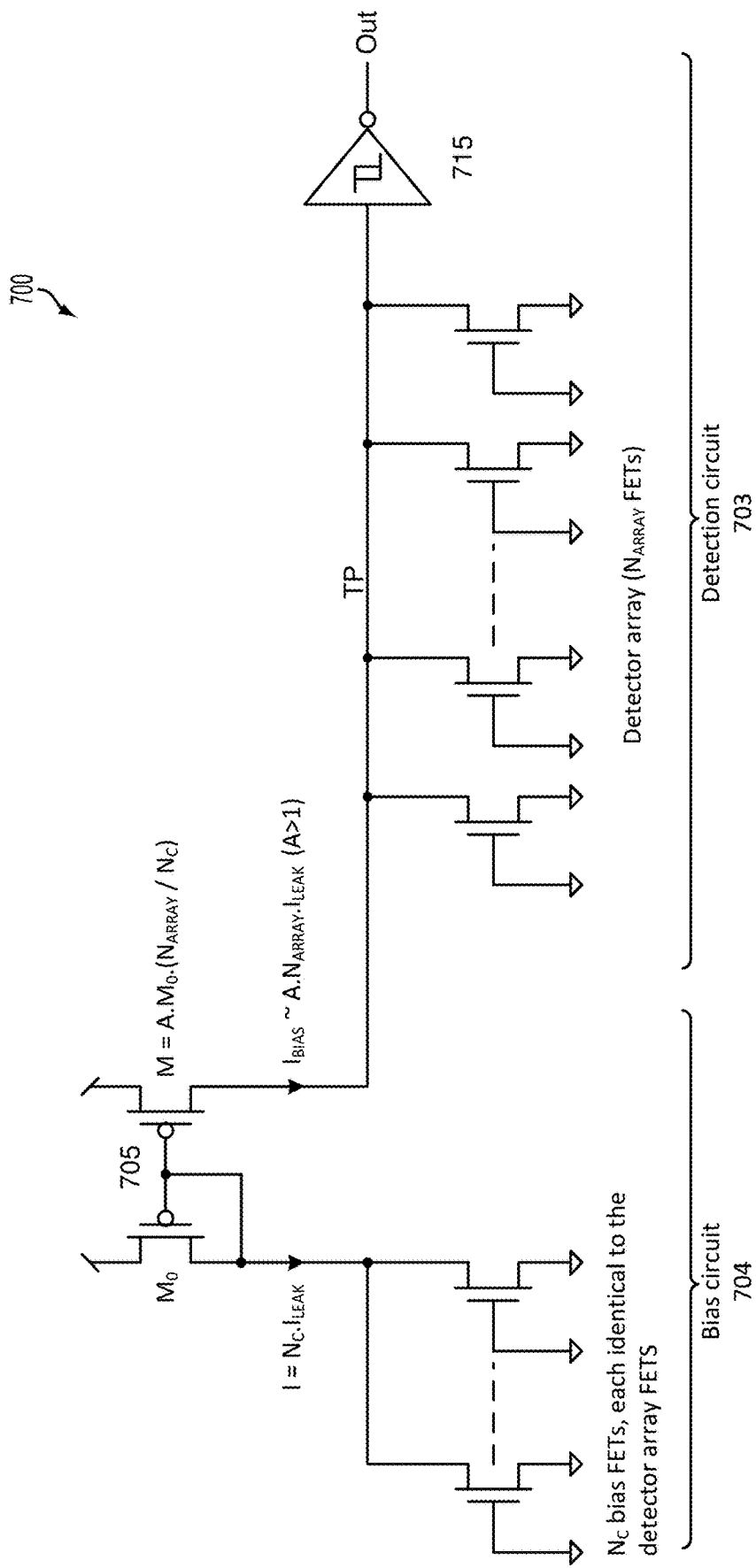
FIG. 7 is a component block diagram illustrating an example self-biasing DC photodetector according to various embodiments.

FIG. 7 illustrates a self-biasing direct current (DC) photodetector 700 according to some embodiments. Here, the NMOS devices 703 used to detect incident radiation are biased with a DC current ($I_{BIAS}$) that is adjusted to be a little higher than the NMOS FET leakage current. This ensures that, in the absence of incident illumination, the test point is pulled to a logical high voltage. When illuminated, one or more of the devices in the phototransistor detector array conduct a higher current and pull the test point to a logical low voltage.

The bias circuit 704 shown on the left of FIG. 7 maintains the bias current ($I_{BIAS}$) as follows. A small array of NMOS bias FETs 704, each identical to the NMOS detector array FETs 703, may be used to generate a leakage current. In this embodiment, a respective gate of each of the plurality of NMOS devices 704 in the small array are coupled together and further coupled to ground, a respective drain of each of the plurality of NMOS devices 704 in the small array are coupled together and a respective source of each of the plurality of NMOS devices 704 in the small array are coupled to ground. This is then amplified by the appropriately ratioed PMOS current mirror 705 to provide a bias current that is a known factor, A, larger than the detector array leakage as required. The leakage current in the bias FETs 704 naturally tracks the leakage current in the detector array FETs 703, and the circuit automatically compensates for variations with temperature, aging or supply voltage.

In order to function correctly, the NMOS bias FETs 704 may be located away from the array FETs 703 so that incident laser illumination will not affect both. If this is not possible, a separate photo-detector of the types discussed above may be used to protect the bias circuit. For example, by placing a detector circuit (e.g., 300, 400A, 400B, 500, 600), such as the embodiments shown in FIGS. 2-6 above adjacent to the NMOS bias FETs 704, incident laser illumination of the NMOS bias FETs 704 may be detected to ensure that no laser light attack impacts the performance of the NMOS bias FETs 704 in the bias circuit.

The advantage of this type of detection circuit is that the detector array of NMOS detector array FETs 703 may be large and distributed across the protected circuit, as discussed further below. In this way, the detection circuit can detect attacks based on large area, low intensity illumination of the type discussed above.

Figure 8:
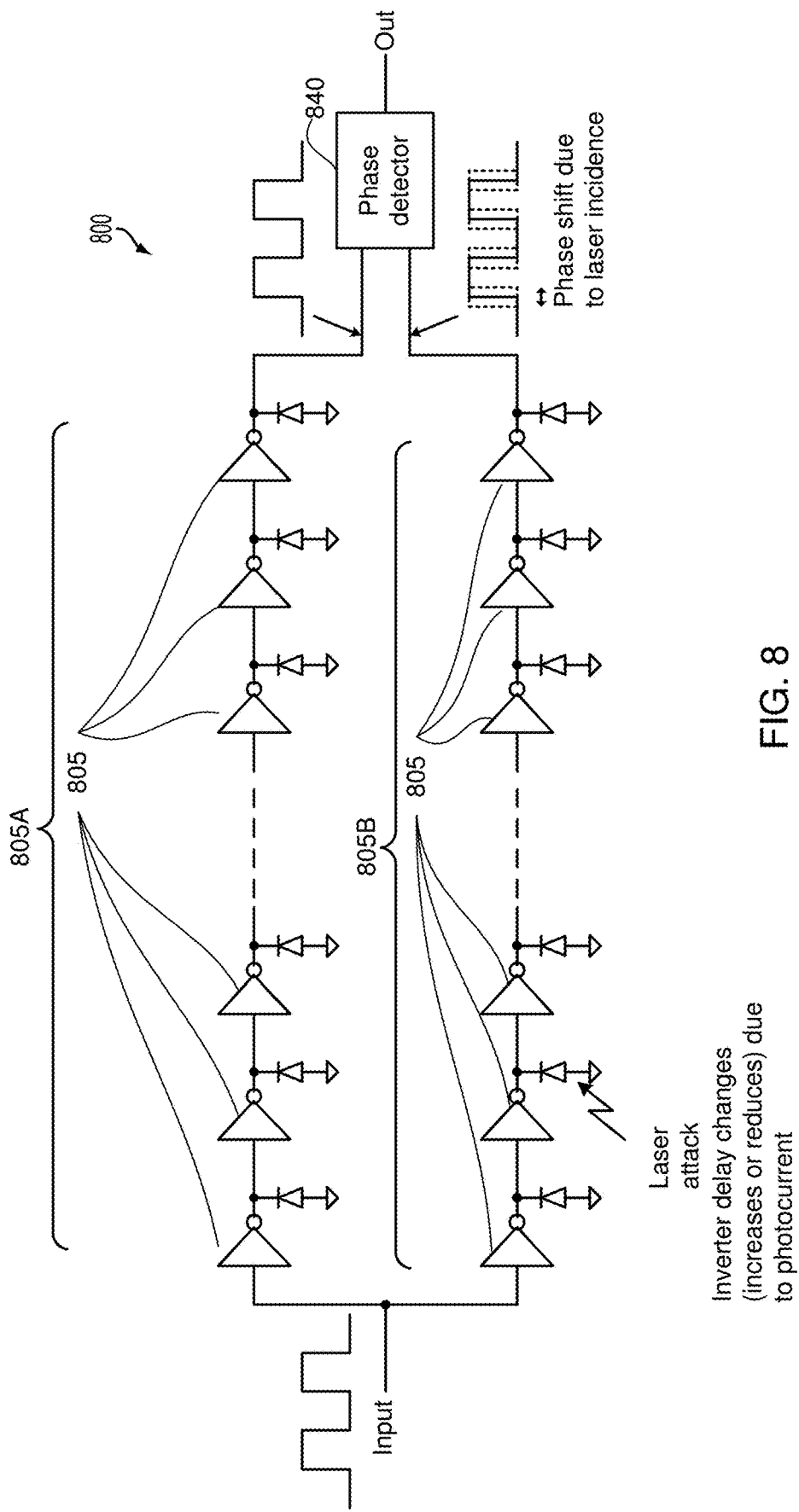
FIG. 8 is a component block diagram illustrating an example differential delay photosensor according to various embodiments.

FIG. 8 illustrates a differential delay photosensor 800 according to some embodiments. As discussed above, it may be desirable (or necessary) to detect the perturbation of circuit switching events due to illumination. As illustrated in FIG. 8, two inverter chains 805A and 805B, each made up of a chain of detector circuits 805 (similar to detector circuits 300, 400A, 400B, 500, 600), receive the same pulse stream input, and under normal conditions the output pulse stream should be identical. However, if one chain is exposed to incident radiation, altering the propagation delay through one or more stages, a phase difference between the outputs of the inverter chain 805A and 805B will be observable at the outputs in a phase detector 840.

To effectively detect a laser attack (i.e., an incident of illumination), the two chains 805A and 805B may be separated sufficiently from one another such that any incident laser pulse will affect one inverter chain (e.g., 805B) but not the other inverter chain (e.g., 805A).

Figure 9:
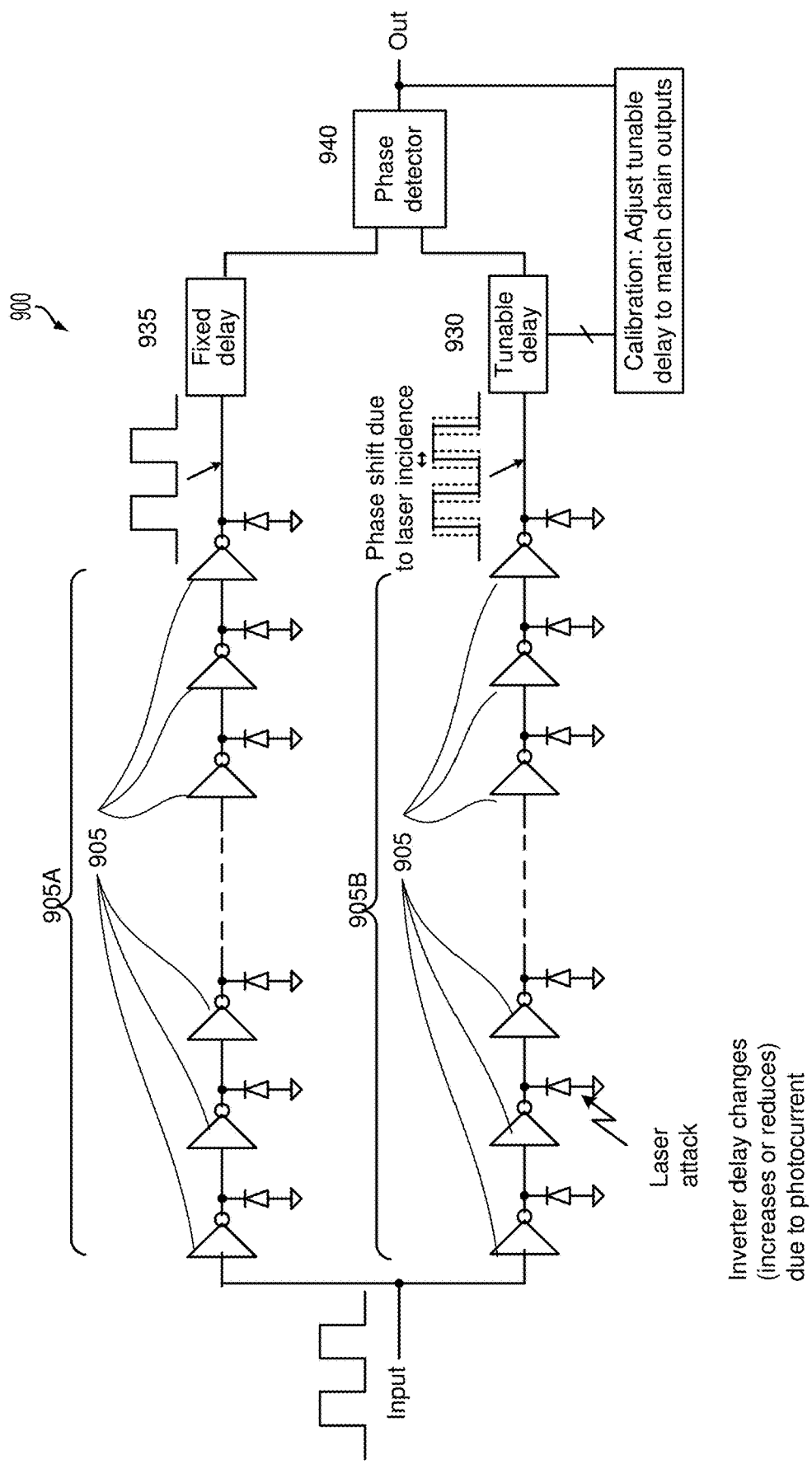
FIG. 9 is a component block diagram illustrating an example differential delay photosensor with practical phase detector according to various embodiments.

In practice, ensuring perfect phase matching between the two inverter chains in the absence of radiation may be impractical, particularly if the chains are physically separated. FIG. 9 illustrates a differential delay photosensor 900 with practical phase detector according to another embodiment.

In this embodiment, a tunable delay 930 may add a tunable delay at the output of one chain 905B with a fixed delay 935 adding a fixed delay to the other chain 905A. The fixed delay 935 may add a fixed delay that is about the mid-point of the tuning range of the adjustable delay added by the tunable delay 930. At final product test, the tunable delay 930 may adjust the delay to minimize the phase difference between a first chain 905A and a second chain 905B in the absence of illumination. No external equipment is required for the calibration, and if necessary, the calibration may be repeated periodically in situ during product life, for example at power-up or at any other appropriate time. During operation, any increase or reduction in delay through either chain (905A or 905B) due to an illumination attack may be detected by the phase detector 940.

The laser illumination illustrated in FIG. 9 is shown affecting the inverter chain 905B connected to the tunable delay 930. Of course, the effect of laser illumination on the chain 905A connected to the fixed delay 935 can also be detected in phase detector 940—all that is required is that the delays through the two chains differ. As discussed above with respect to the circuit 800 in FIG. 8, if one chain is exposed to incident radiation, altering the propagation delay through one or more stages, a phase difference between the outputs of the inverter chain 905A and 905B will be observable at the outputs in a phase detector 940.

The circuit 900 illustrated in FIG. 9 is just one example of an embodiment that can detect changes in gate delay. The circuit shown will detect changes in either delay or duty cycle. The circuit 900 shown is simple and sensitive, but other options based on the same principle are possible. A ring oscillator, for example, will change in frequency if one or more of its stages are illuminated, and any circuit designed with marginal setup or hold times may fail under illumination.

The circuit 900 described above requires that the phase matching without illumination be maintained across voltage and temperature. If the chains are well matched, their natural tracking is likely to be sufficient. However, if this is not the case then simple retuning under the assumption that no illumination is present can be performed whenever a voltage change is applied, or a temperature change is detected. If the assumption of no illumination is not valid and the circuit is tuned during a laser pulse attack, then the circuit will detect a phase difference and report an attack when the laser pulse is removed. The phase matching operation may be performed manually or automatically by a controller. The controller may periodically perform the phase matching operation over the product life of the photocurrent detection circuit during times of known incident radiation attack or during known times of an absence of incident radiation attack.

The inverter chains (e.g., 805A, 805B, 905A, 905B) may be similar to those discussed below for detecting static faults. The same circuit could be operated in either mode.

As described above, photo-detectors capable of sensing radiant energy from a laser or other source impinging on an integrated circuit are well known, and practical detector designs are available that can be built with no additional processing or structures other than those already present in the integrated circuit. However, building photo-detectors capable of robust detection of laser-based attacks involves additional capability as provided in the various embodiments disclosed herein.

First, the photo-detectors and associated readout circuitry of various embodiments may provide a signal or signals that may be available to and may be used by, for example, a hardware controller, software running on a secure processor or a combination of those in order to implement one or more countermeasures in response to detection of a photocurrent or a suspected laser-based perturbation attack. In general, circuitry and systems used to implement a countermeasure may be similar to those used with other perturbation attack detectors. For example, countermeasures may include actions conventionally implemented by circuitry in response to a voltage deviation, a high or low temperature condition, or a frequency deviation. As a further example, one or more countermeasures may include depowering or isolating a processor (e.g., a secure processor), blocking access to certain memory (e.g., secure memory, program memory, etc.), interrupting or depowering a memory access controller (MAC) (e.g., a MAC controlling access to a secure memory, program memory, etc.), and the like. In some embodiments, countermeasures may include disabling a buffer in clock or data path due to the photocurrent induced by radiation. Such one or more countermeasures may be permanent or temporary (e.g., resettable).

Second, the response to detection of incident radiation of circuitry according to various embodiments may be fast enough to allow one or more countermeasures to be taken before any corrupted data can be read out.

Third, the photo-detectors of various embodiments may be configured so they cannot be disabled by, for example, local cutting or deposition techniques (FIB etc.)

Fourth, the photo-detectors of various embodiments may be distributed in such a manner that any incident beams cannot be simply focused away from the detector.

FIGS. 10-22 described below illustrate alternative circuit configurations that provide these capabilities according to various embodiments.

Figure 10:
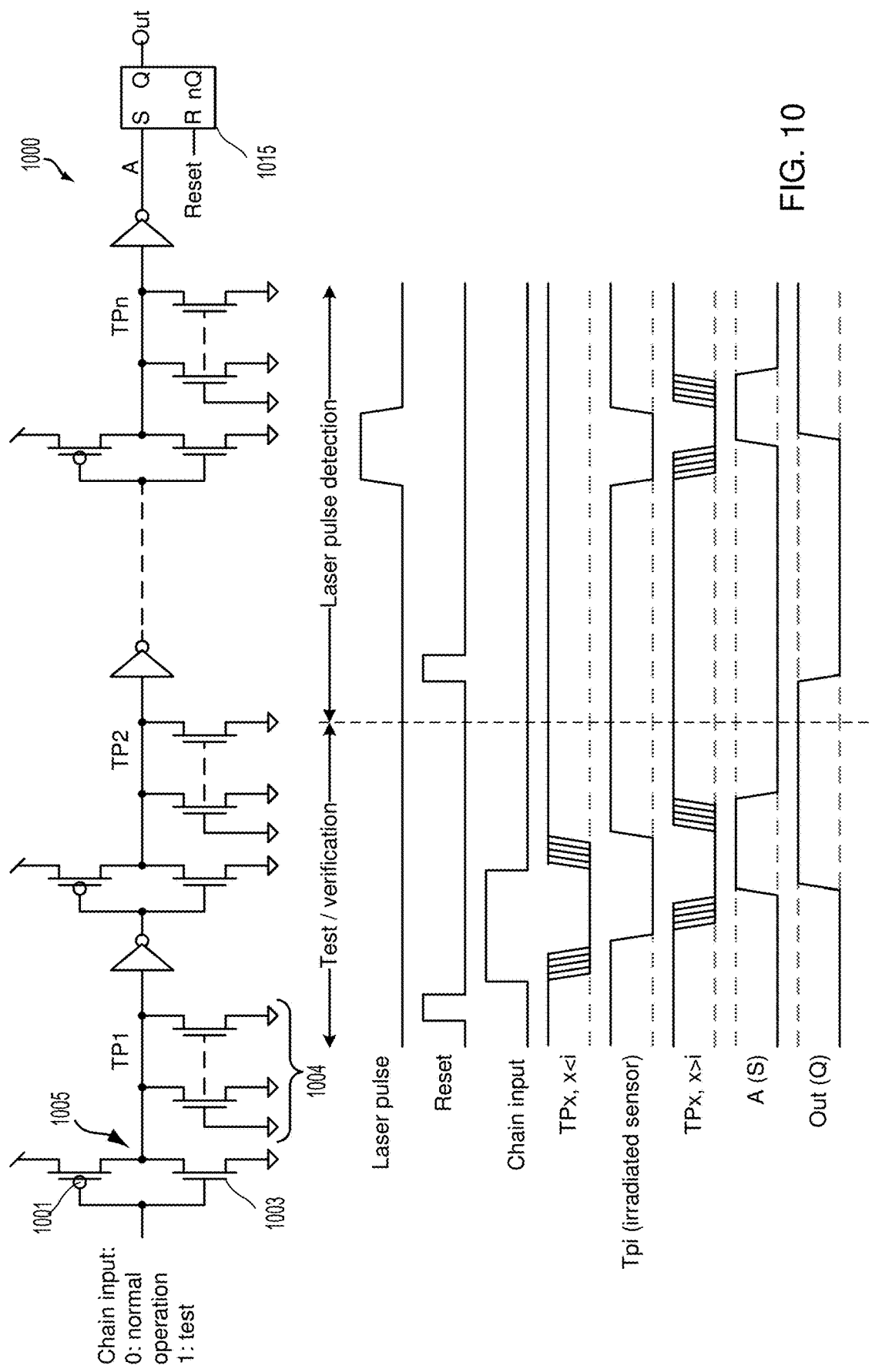
FIG. 10 is a component block diagram illustrating an example chained photo-sensitive inverters according to various embodiments.

FIG. 10 illustrates a chain of photo-detectors 1000. As illustrated, a photocurrent detection circuit may be made up of a chain of photo-detectors. Each photo-detector circuit may include a logic circuit 1005. The logic circuit may be a CMOS inverter including a PMOS device 1001 and an NMOS device 1003. Each photo-detector circuit 1000 may also include additional NMOS devices 1004 coupled in parallel to one another and the NMOS device 1003 of the logic circuit 1005. The gate and source of each additional NMOS device 1004 may be coupled to ground. The drain of each additional NMOS device 1004 may be coupled with the output of the logic circuit 1005 and to the input of the successive photosensitive circuit in the chain of photo-detectors 1000. A latch 1015 may be coupled to the last photo-sensitive circuit in the chain 1000 to record the output of the chain of photo-sensitive circuits. Thus, in the embodiment illustrated in FIG. 10 a first photo-sensitive circuit receives an input. The output of the first photo-sensitive circuit may be coupled to a second photo-sensitive circuit in the chain of photo-sensitive circuits. FIG. 10 also illustrates simplified timing for an initial test mode (used to verify that the chain is functional) and operation when a laser pulse is detected.

During normal operation, the chain input is set low and the output latch reset. In the absence of irradiation, the output of each photo-sensitive inverter (TP1, TP2 ... TPn) is high. If one (or more) of the inverters is irradiated, then the associated TP is pulled low as illustrated, causing the output of the latch at the end of the chain to go high indicating that a threat has been detected. Thus, if any of the photo-sensitive circuits in the chain 1000 is irradiated with laser light, the output will indicate the potential attack. Thus, by spreading the location of each photo-sensitive circuit in the chain across an operating circuit, any incidence of irradiation that occurs anywhere on the underlying protected circuit may be detected.

A chain of sensors could be defeated by, for example, cutting the connection to the final latch. Such a permanent attack can easily be detected, however, simply by setting the chain input to 1 which will cause the output to go high in the same manner as if a laser attack was detected. In various embodiments a simple test of this type can be implemented at power up, following system reset, periodically during operation, immediately before a sensitive operation by the protected circuit, or any other appropriate time.

The sensor chain 1000 illustrated in FIG. 10 uses only nFETs as sensors. Any induced photocurrents pull the associated test points low, and in the initial state all test points must be high. The buffers included after each stage to drive the routing between sensors are inverting to ensure that this is the case.

In some situations, it may be desirable to minimize the area taken up by individual sensors even if this is achieved at the expense of slower signal propagation between sensors. In such cases, it may be useful to eliminate the inverting buffers. However, with the design illustrated in FIG. 10, eliminating the inverters would prevent correct operation of the sensor chain. Alternate test points would be high and low, and those sensors with low test points would simply block any signal propagation when illuminated, preventing detection of a laser attack.

Figure 11:
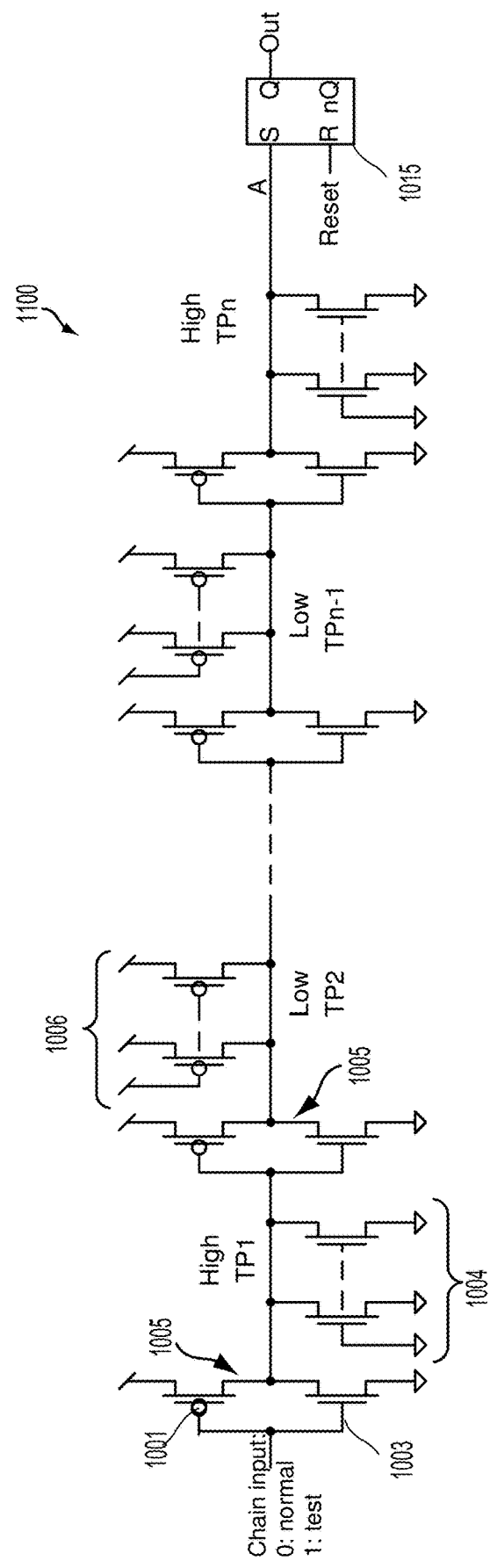
FIG. 11 is a component block diagram illustrating an example sensor chain with alternating nFET and pFET photo-transistors according to various embodiments.

FIG. 11 illustrates a photosensitive circuit chain 1100 with alternating nFET and pFET photo-transistors according to another embodiment. Such a chain may overcome the problem described above. Similar to the chain of photo-detectors 1000 in FIG. 10, each photo-detector circuit in the chain of photo-detectors 1100 may include a logic circuit 1005. The logic circuit 1005 may be a CMOS inverter including a PMOS device 1001 and NMOS device 1003. A first photo-detector circuit in the chain of photo-detectors may also include additional NMOS devices 1004 coupled in parallel to one another and the NMOS device 1003 of the logic circuit 1005. The gate and source of each additional NMOS device 1004 may be coupled to ground. The drain of each additional NMOS device 1004 may be coupled with the output of the logic circuit 1005 and to the input of the successive photosensitive circuit in the chain of photo-detectors 1100. In addition, a second photo-detector circuit in the chain of photo-detector circuits may also include additional PMOS devices 1006 coupled in parallel to one another and the PMOS device 1001 of the logic circuit 1005. The gate and source of each additional PMOS device 1006 may be coupled to Vdd (i.e., logic high voltage). The drain of each additional PMOS device 1006 may be coupled with the output of the logic circuit 1005 and to the input of the successive photosensitive circuit in the chain of photo-detectors 1100. A latch 1015 may be coupled to the last photo-sensitive circuit in the chain 1100 to record the output of the chain of photo-sensitive circuits. All test points that are normally high are connected to n-channel phototransistors, while those test points that are normally low are connected to p-channel phototransistors. Thus, incident laser light will pull high test points low and low test points high, the signal will propagate along the chain as before and there will be no blockage. In the photosensitive circuit chain 1100, the successive photosensitive circuits may alternate between additional NMOS devices 1004 coupled to the logic circuit 1005 and additional PMOS devices 1006 coupled to the logic circuit 1005.

Figure 12:
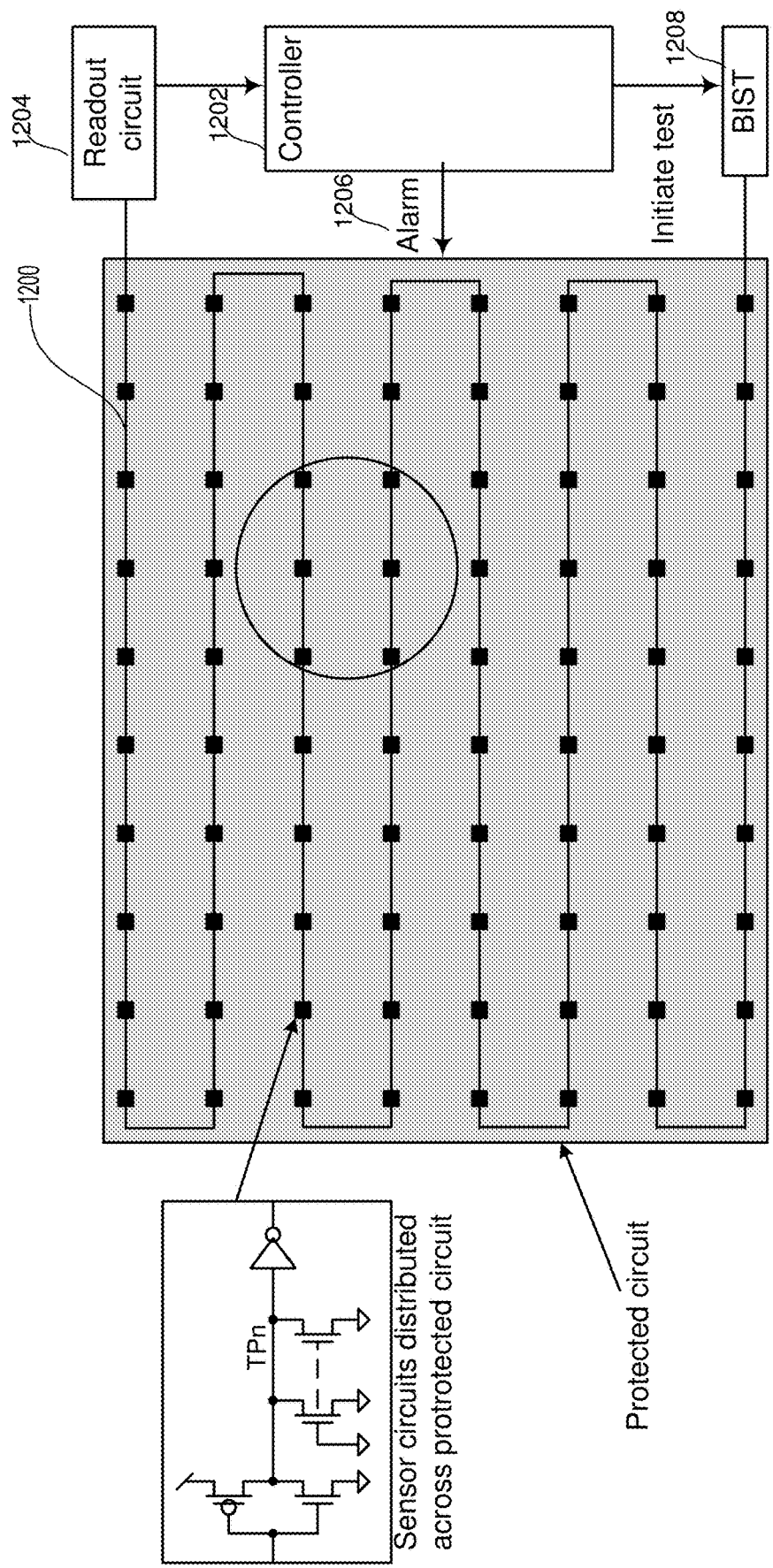
FIG. 12 is a component block diagram illustrating an example of multiple sensor circuits distributed in a single chain according to various embodiments.

In various embodiments, multiple photo-detectors can be distributed throughout the protected circuit (such as a secure processor) and chained as illustrated in either FIG. 10 or FIG. 11 to provide a single output reporting an attack somewhere over the processor area. Such an embodiment chain of photo-detectors 1200 is illustrated in FIG. 12. In this embodiment, the individual photo-detector circuits in the chain 1200 are relatively small, and the overall area cost is likely to be minor. Interaction of at least one photo-detector with any incident laser pulse can be ensured if the photo-detector spacing is less than the spot size, although in practice such a high density is unlikely to be necessary as any attack will probably involve the laser spot being swept across the protected circuit and as long as the laser spot hits a photo-detector at some point in the sweep it will be detected.

FIG. 12 also shows, for the sake of illustration, a controller block 1202 that accepts the output from the photo-detector chain 1204, and delivers an alarm signal 1206 to the protected circuit when a potential attack is detected. The controller may also initiate tests of the sensor chain via the Built-in Self-test (BIST) circuit 1208 when required. A plurality of photo-detector circuits may be configured in a serial sensor chain 1200 and distributed throughout a protected circuit. The output of the serial sensor chain 1200 may be coupled to a readout circuit 1204. The readout circuit 1204 may be coupled to a controller block 1202. The controller block 1202 may deliver an alarm 1206 when an incident of radiation is detected along any of the plurality of photo-detector circuits in the serial photo-detector chain 1200.

Figure 13:
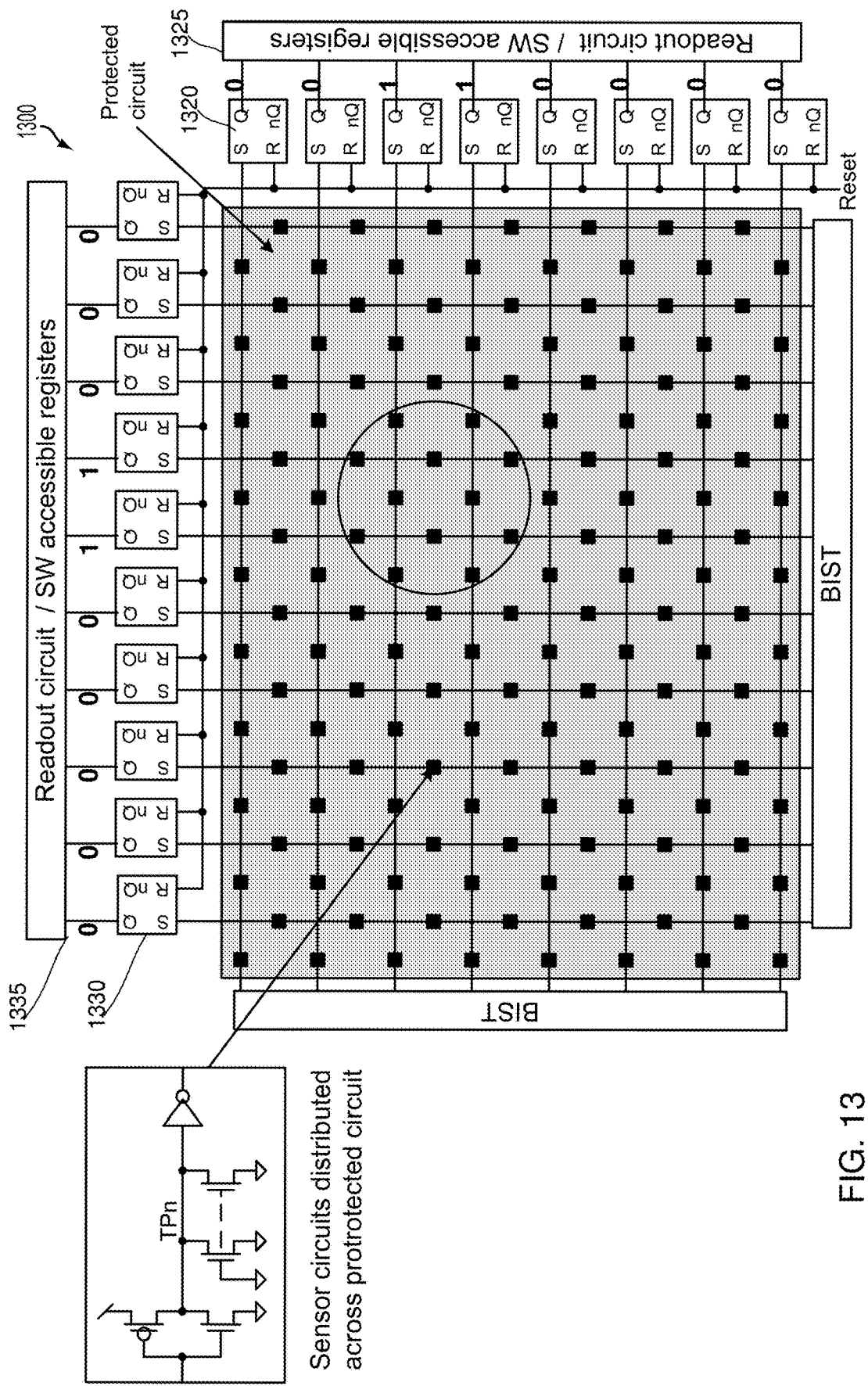
FIG. 13 is a component block diagram illustrating an example array of inverter-based photo-sensors according to various embodiments.

One potential drawback of implementing all photo-detector sensors in a single serial chain is that the propagation delay from photo-detector sensors near the beginning of the chain 1200 to the output latch will be long. An alternative embodiment implements the photo-detector sensors in an array of consecutive rows and columns 1300 as illustrated in FIG. 13. Such an arrangement also has the advantage of providing information about the size and location of the incident pulse. The array of photo-detector circuits 1300 may be distributed across a protected circuit in a series of consecutive rows and columns. A plurality of row latch circuits 1320 may be coupled to each respective row of photo-sensitive circuits. A plurality of column latch circuits 1330 may be coupled to each respective column of second photo-sensitive circuits. A row readout circuit 1325 may be coupled to an output of each of the plurality of row latch circuits 1320. A column readout circuit 1335 may be coupled to an output of each of the plurality of row column circuits 1330. The output of each respective row latch circuit 1320 and each respective column latch circuit 1330 may be read to determine a specific location of a photo-sensitive circuit that experienced an incident of radiation that induces a photocurrent. In this manner, the location of the incident radiation may also be detected.

The discussion above is limited to the static inverter-based photodetector. However, the differential delay photo-detector described above is similar and can be integrated with a secure processor in a similar manner. The main changes needed for the differential delay photo-detector are: phase detectors rather than simple latches are used at the end of each chain; the chains operate in pairs, ideally with each of the pair physically separated; the inputs to the chains are clocked; and the details of the inverter chains (device sizes and the number of transistors connected in parallel to increase photo-sensitivity, for example) may be different.

A common design, with appropriate drive and readout circuits, can be operated in either static or differential phase detection modes.

Figure 14:
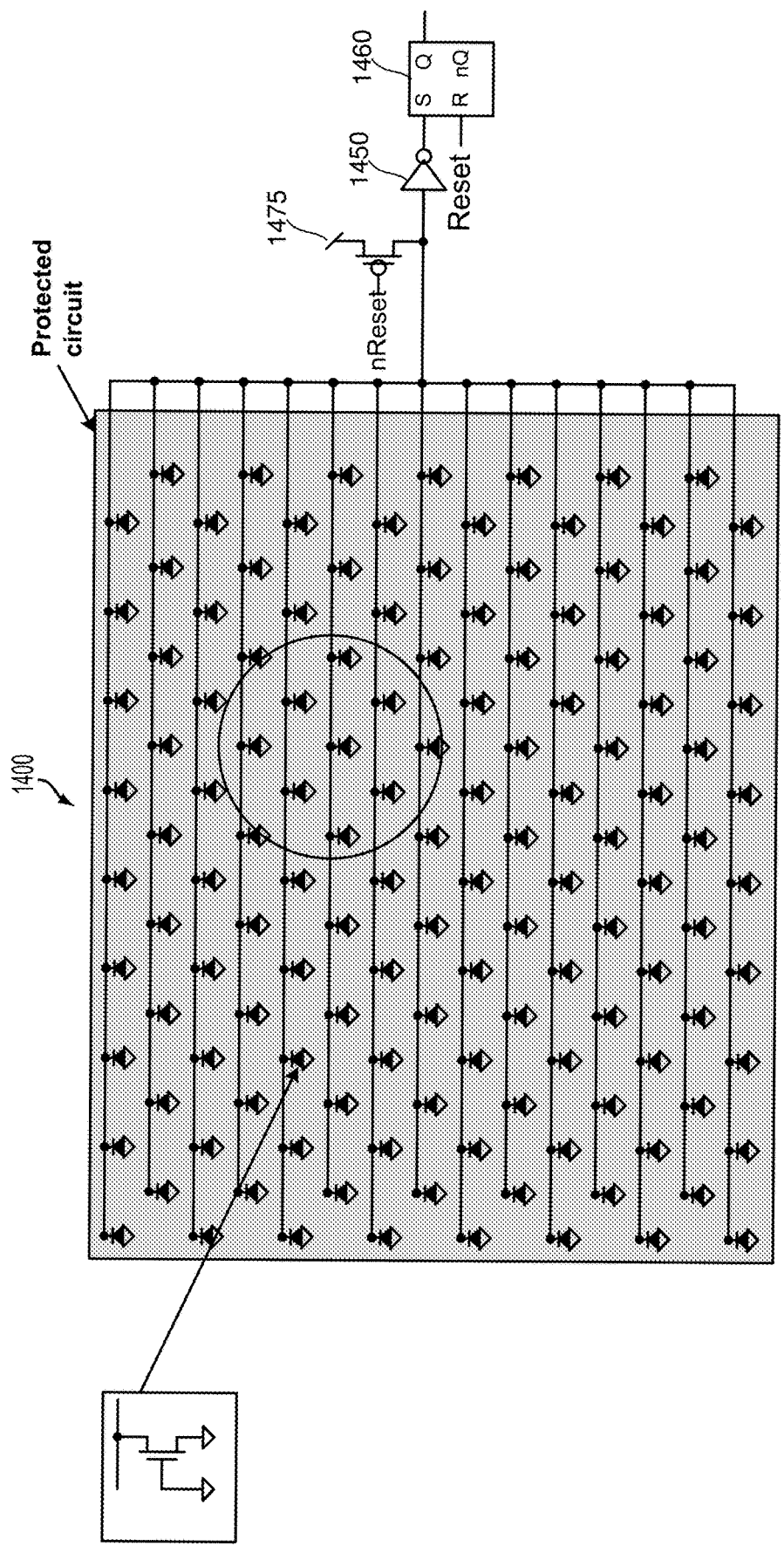
FIG. 14 is a component block diagram illustrating an example photodiode array across protected circuit with common test node according to various embodiments.

FIG. 14 illustrates a photodiode array 1400 distributed across a protected circuit with a common test node according to an embodiment. In the embodiment illustrated in FIG. 14, the detectors are configured with a single test point serving the whole processor. This simple arrangement provides a single output reporting an attack somewhere on the processor, but suffers the drawback of slow response since only a few illuminated photodiodes must discharge the whole test node. In the event any of the detectors in the array are illuminated with incident light, the detector circuit may record a logic level low on the common output due to photocurrents. The logic level low output may be inverted by inverter 1450 and latched in the latch 1460. Once the incident light attack is detected and recorded in the latch 1460, the circuit may be reset by PMOS device 1475.

Figure 15:
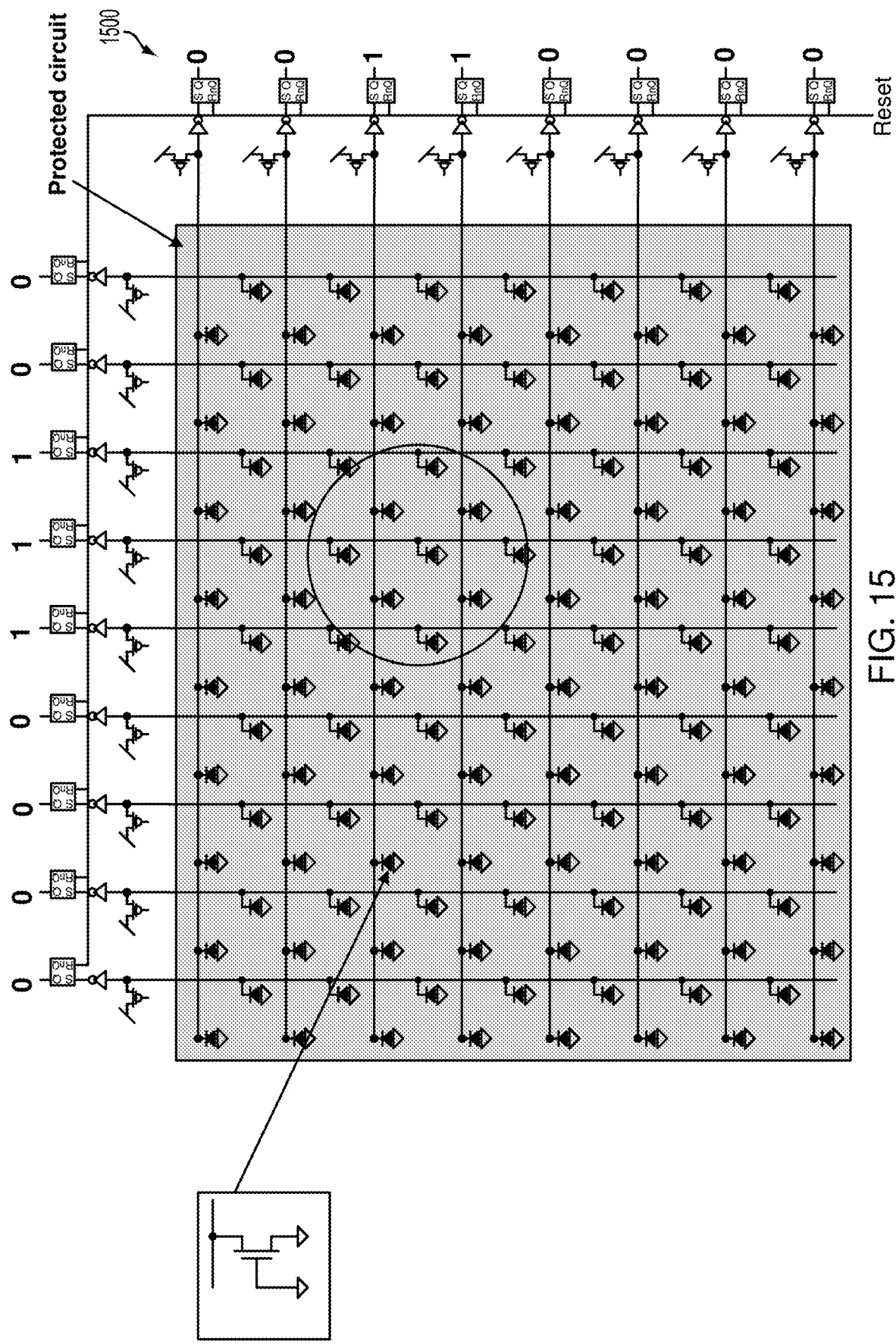
FIG. 15 is a component block diagram illustrating an example array of photodiodes according to various embodiments.

FIG. 15 illustrates an array 1500 of photodiodes according to another embodiment. In such embodiments, multiple off-state NMOS FETS, acting as photodiodes, are connected in parallel. In the embodiment illustrated in FIG. 15, the photodiodes are arranged in rows and columns, offering faster response and location and spot size information about the incident laser pulse. In a manner similar to the array 1400 shown in FIG. 14, each column or row may be reset by a PMOS device on each row and column line. By reading the output of each latch disposed on each column and row, an approximate location of the detected illuminated light may be determined on a XY coordinate plane.

Figure 16:
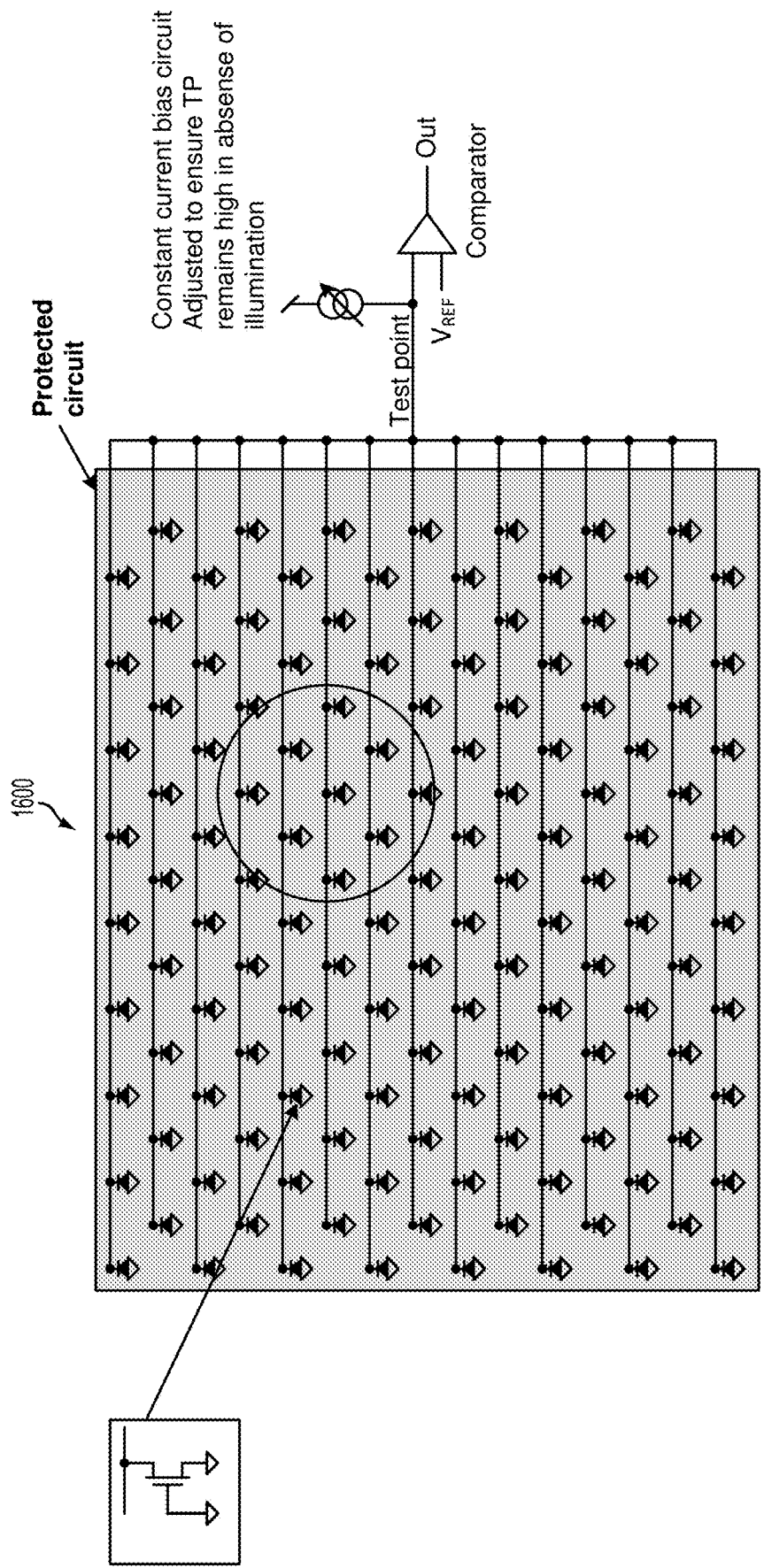
FIG. 16 is a component block diagram illustrating an example array of DC detectors with self-biasing according to various embodiments.

The self-biasing DC photo-detector array may be integrated with a secure processor in a similar manner to the dynamic photo-detector discussed above. FIG. 16 illustrates an array of DC detectors with a self-biasing circuit 1600 according to another embodiment. The constant current bias circuit shown on the right of the figure may be similar to the bias circuit shown in FIG. 7.

The embodiments illustrated and described above locate photo-detectors within the area of a secure processor or other protected circuit. Any response to a potential attack involves the sensor array outputs being read, interpreted and appropriate action taken, all of which may take multiple clock cycles.

In some embodiments, photo-sensitive inverters or gates can also be integrated directly into the clock tree or a critical data path as part of the processor circuitry to provide a circuit-based countermeasure. In such embodiments, any incident laser pulse will cause the clock distribution or signal propagation to stop immediately and, if implemented in an embodiment, result in one or more countermeasures that prevents any useable data from being extracted. Adding photo-sensitive clock or signal buffers in this way also provides a countermeasure mechanism for disrupting processor operations. In some embodiments, such circuit-based countermeasures may be designed to prevent exploitation of the protected circuits (e.g., a secure processor, memory, etc.) as part of an attack.

Figure 17:
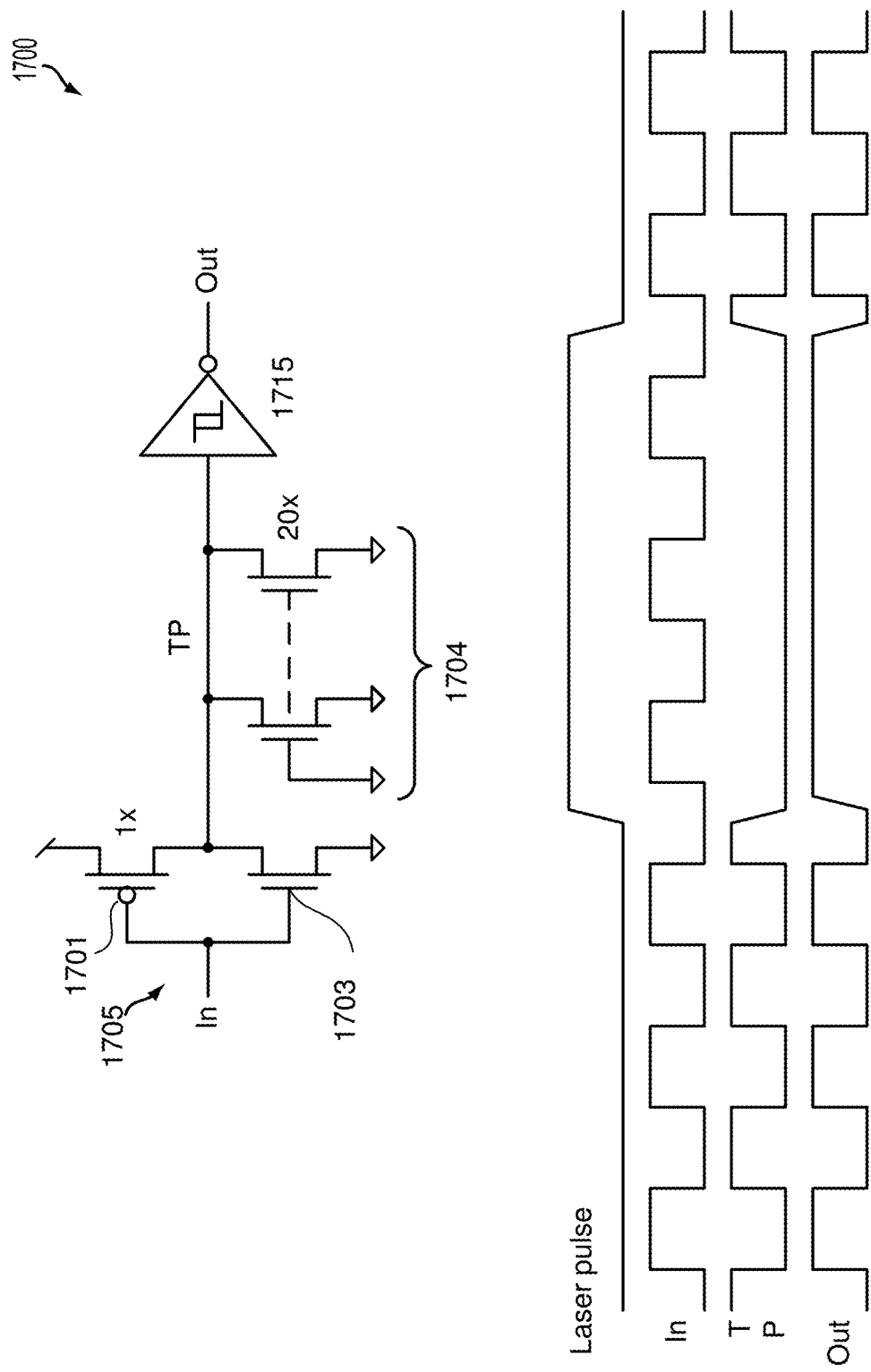
FIG. 17 is a component block diagram illustrating an example integrated clock or signal buffer interrupted by an incident laser pulse according to various embodiments.

In the various embodiments that implement long chains of photo detectors scattered across a protected circuit discussed above, a significant amount of delay may occur between the incident laser attack and the actual notification of the detection due to the need for the detection to propagate through the entire chain of photo-detectors. FIG. 17 illustrates a photodetector circuit 1700 for integration into a circuit clock or signal buffer according to an embodiment and the corresponding timing diagram of the operation of the integrated photo-detector circuit 1700. By incorporating a photo-detector 1700 into another circuit, such as a clock or signal buffer for the protected circuit, any data or signaling performed by the protected circuit may be halted. For example, a photo detector circuit 1700 may include a logic circuit 1705. The logic circuit 1705 may include a PMOS device 1701 and a NMOS device 1703 configured as an inverter. The source of the PMOS device 1701 may be coupled to Vdd (i.e., logic voltage level high). The source of the NMOS device 1703 may be coupled to ground (i.e., logic level low). The drains of the PMOS device 1701 and the NMOS device 1703 may be coupled together to form the output of the logic circuit 1705. The gates of the PMOS device 1701 and the NMOS device 1703 may be coupled together to form the input of the logic circuit 1705. The input of the logic circuit may be coupled to a pulse clock signal In. Additional NMOS devices 1704 may be coupled in parallel to one another with their respective gates and sources coupled to ground, while the respective drains of the additional NMOS devices 1704 are each coupled to the output of the logic circuit 1705. As discussed above, in order to create the asymmetrical sizing of the NMOS to PMOS devices and increase the sensitivity of the photo-detector circuit 1700 to incident light and photocurrents, the number of additional NMOS devices 1704 may be significantly larger than the PMOS device 1701. For example, in FIG. 17, a factor of twenty (i.e., 20×) may be used, but greater or smaller number of additional NMOS devices 1704 may be used. The coupled drains of the additional NMOS devices 1704 and output of the logic circuit 105 may form a test point node (TP). This test point node may be coupled to the input of an output inverter 1715.

In operation, the photo-detector circuit 1700 may receive the clock train pulses In at the input of the logic circuit. As a function of the logic circuit 1705 inverter, the train of clock pulses may be inverted at the test point node. In the absence of any illumination of the photo-detector circuit, the signal at the test point node may be inverted by the inverter 1715 to produce an output pulse train that mirrors the input signal. However, if a laser pulse is incident on the photodetector circuit 1700, the photocurrents generated in the additional NMOS device 1704 will pull the test point node to a logic level low voltage for the duration of the laser pulse. The inverter 1715 may invert the test point node signal to produce an output signal that pulses high for the duration of the laser pulse. If the output signal is used as a clock signal for a protected circuit, the protected circuit may suspend operation due to the pulsed output signal. In this manner, an attack to obtain information or signaling from the protected circuit may be protected upon the detection of the photo-current attack. More complex circuits may also be used in various embodiments including, for example, the addition of a latch such that the buffer remains disabled after the laser pulse is removed. Integration of the photosensors as part of the processor also provides inherent robustness because any attempt to isolate or disable the photo-detector will also disable the processor.

The circuits described above can detect a laser pulse or any other form of attack inducing leakage currents. However, the fact that a potential attack has been detected is lost after power cycling. A permanent record of an attack can be created in some embodiments by writing to some form of one time programmable (OTP) or protected non-volatile memory. However, such processes often take time and can be defeated by powering down the IC immediately after an attack. To address this challenge, FIG. 18 illustrates a scheme for permanently recording laser pulse attacks 1800 according to another embodiment.

In the absence of illumination, the high voltage (HV) device M1 passes only leakage current and M2 holds node A low. However, if the circuit is exposed to photons, the PMOS photocurrent in M1 will pull node A to the high voltage ($V_{HV}$). The low voltage (LV) device, M3, connected to node A will be permanently damaged. A suitable measurement circuit connected to M3 can be used to detect the damage, confirming that the circuit has been exposed to a potential photonic attack in the past even after multiple power cycles. High voltage transistor devices such as M1 and M2 may tolerate a voltage of ~1.8 volts (other higher voltage transistor devices may tolerate larger voltage drops across the transistor, e.g., 5 v). Thus, the threshold voltage for a high voltage transistor device may be ~1.8 volts. Low voltage devices, such as M3, may only tolerate lower voltage drops of ~1 volt across the transistor. Thus, the threshold voltage for a high voltage transistor device may be ~1.0 volts. When a voltage larger than a transistor device's threshold voltage is applied across the transistor device, the transistor device may be permanently damaged or destroyed.

In order to allow the photo-generated current in M1 to overcome the pull-down current of M2, M1 must be a much larger (wider, more fins in the case of a FINFET technology) device than M2.

Figure 22:
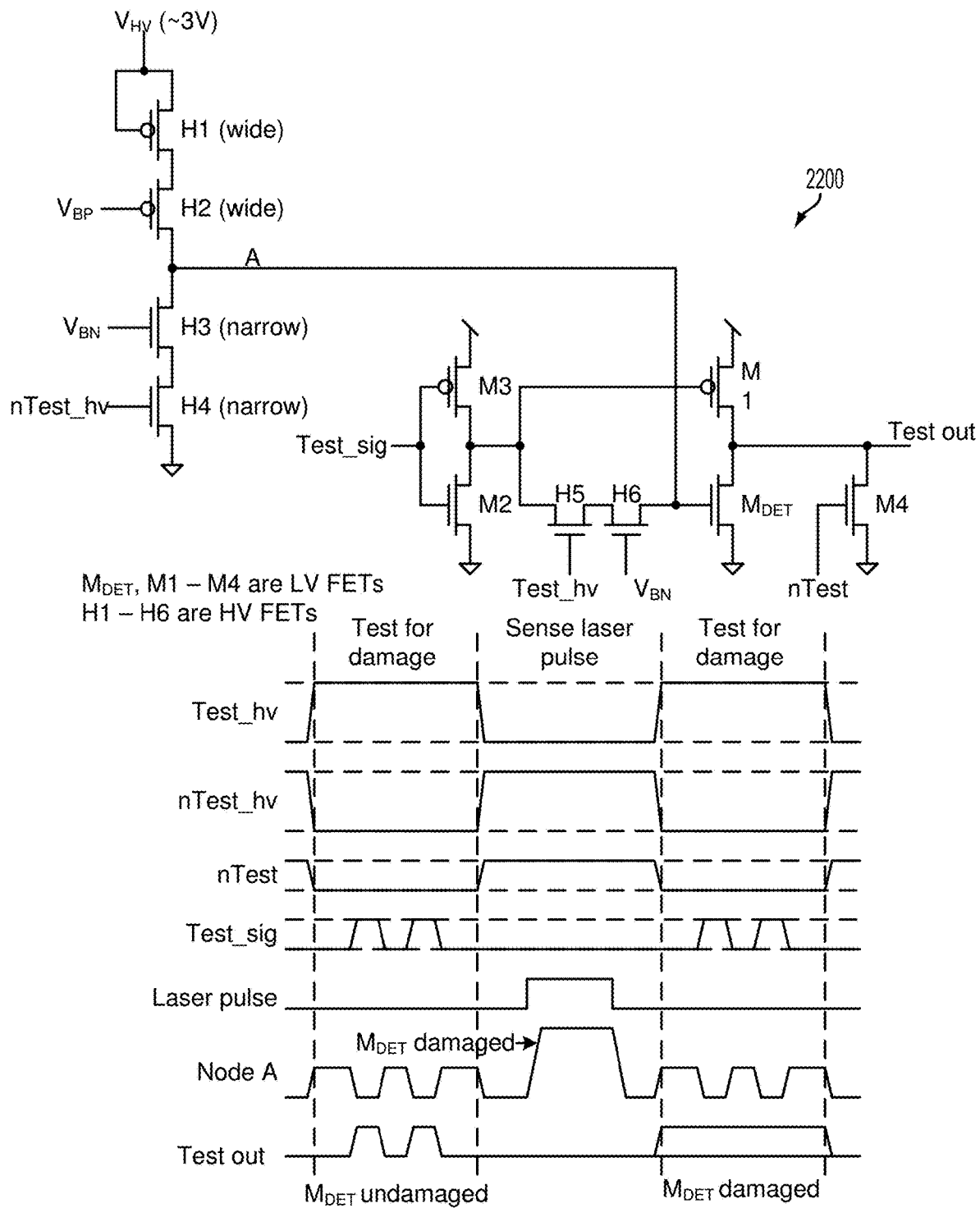
FIG. 22 is a component block diagram illustrating an example laser sensor circuit with FET damage detection according to various embodiments.

In the circuit shown, the damage to the LV FET is likely to be gate oxide breakdown, resulting in either an open gate or a gate shorted to the source or drain. The measurement circuit accommodates either failure mode and some examples are shown in FIGS. 21 and 22.

Figure 19A:
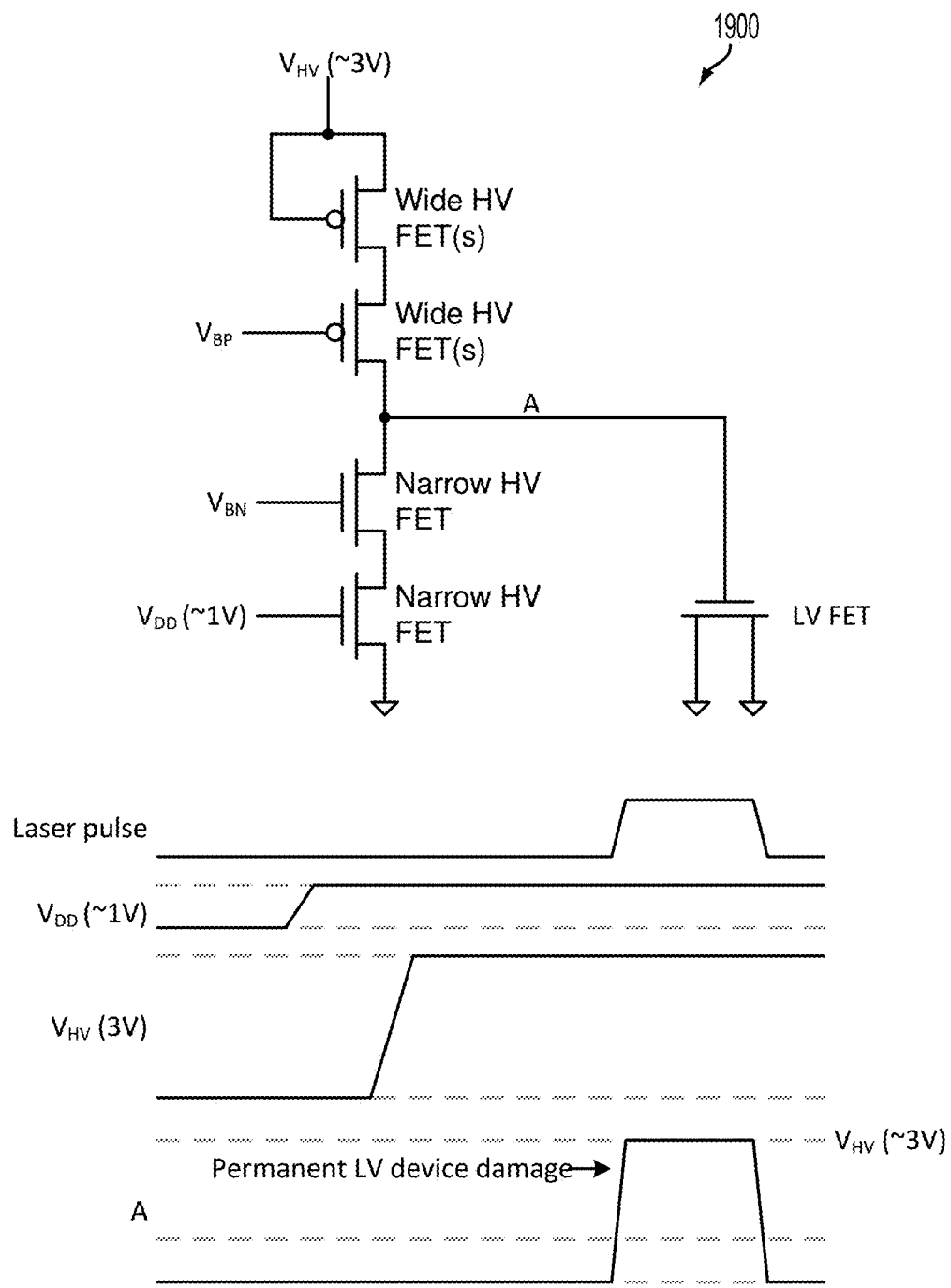

The damage to the LV FET may occur during the laser pulse. FIGS. 19A and 19B illustrate example embodiment circuits 1900, 1950 for permanently recording a laser pulse attack using increased device damage voltage. Increasing the applied voltage using the schemes illustrated in FIGS. 19A and 19B will reduce the time needed to induce damage. Thus, the LV FET may operate as a fuse. However, the reaction time of the circuit configuration in FIG. 18 may induce damage to the LV FET in a significantly faster manner.

In the embodiment 1900 illustrated in FIG. 19A, a higher supply voltage available in the IC (for example the ~3V required for USB2 interface circuits) is used and controlled with cascoded devices. In advanced nodes, wide guard bands may be used around nets connected to 3V, making the sensor very large and limiting the density of such sensors.

FIG. 19B illustrates an alternative embodiment 1950 in which a capacitor is added to create a charge pump and increase the voltage applied to the LV device to about $V_{HV}+V_{DD}$. The charging circuit, shown as an ideal switch in FIG. 19B, may be designed such that it does not clamp node B and prevent it from reaching the high voltage.

The circuits described above use the direct action of the laser to initiate damage to the LV device, minimizing any delay between detection of the laser pulse and starting the damage process. A similar circuit, essentially a HV level shifter, could also be used to initiate device damage as a permanent record of laser attack when prompted by the input from one of the photon detector circuits as described with reference to FIGS. 4-16.

The sacrificial device damaged in the examples above is a low voltage FET. However, any suitable device damaged quickly by excess voltage could be used.

Figure 20:
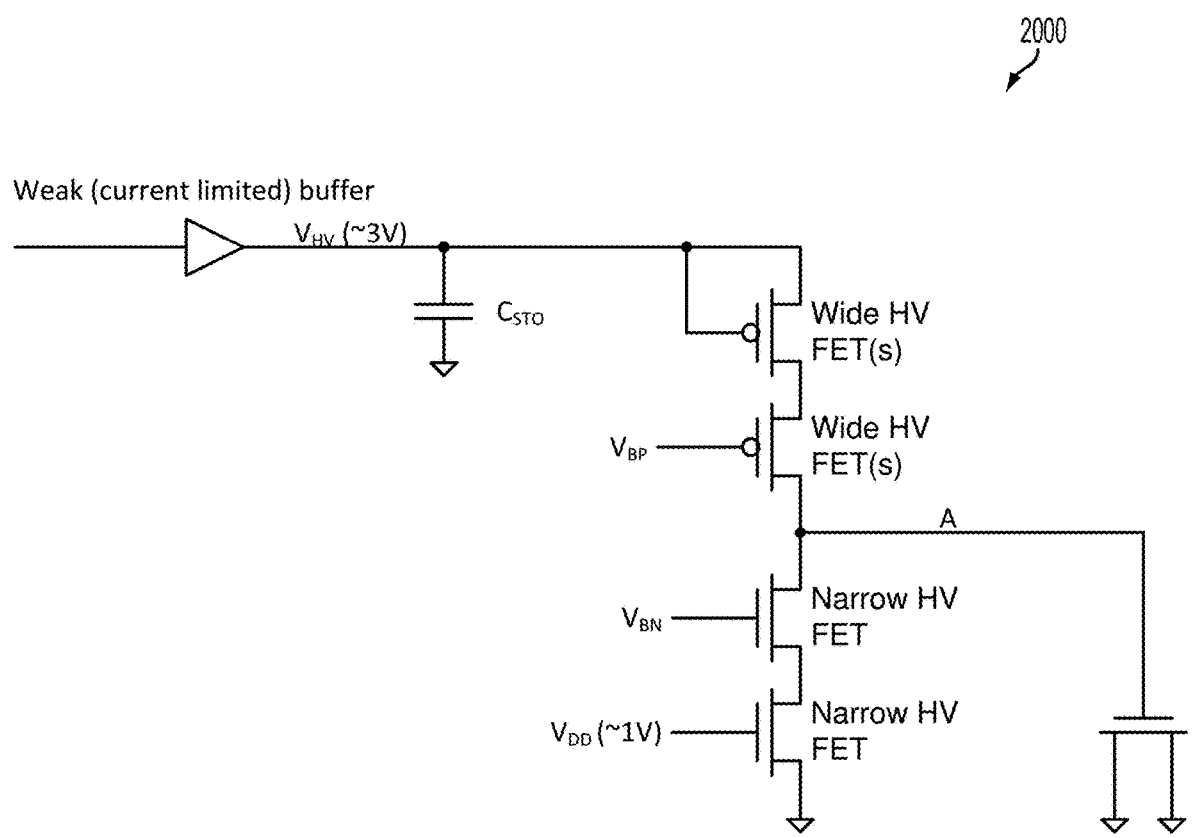
FIG. 20 is a component block diagram illustrating an example non-volatile laser detector with high voltage current limit according to various embodiments.

Some embodiments may limit the current drawn from the HV supply when the circuit is triggered by a laser pulse. FIG. 20 illustrates a simple circuit 2000 to do so in according to another embodiment.

The HV rail to the circuit may be delivered via a current limited buffer. The storage capacitor, $C_{STO}$, may be large enough to deliver the energy needed to damage the LV device, but thereafter any DC path from the HV rail to ground (for example, if the LV devices fails with a short and the laser pulse is still on) will not pull down the supply.

Various example circuits are discussed below that could be used to detect the damage to the low voltage device discussed above. The detection does not depend on the type of damage induced (for example, the device might become a fixed open circuit with no conduction, or there might be a permanent short circuit between any two or more of the device electrodes). The specific circuits chosen are not critical and other options would achieve the same result. In general, the detection circuit should not prevent the LV device from being damaged, and the detection circuit should function regardless of the type of damage induced.

FIG. 21 illustrates a laser sensor circuit with FET damage detection 2100 according to an embodiment. FIG. 22 illustrates an alternative laser sensor circuit with FET damage detection 2200 according to another embodiment.

The embodiment circuit 2100 shown in FIG. 21 operates in two phases.

Phase one is a sense laser phase in which the Test_sig input is high, M2 is on and the source of H4 is at ground potential. The nTest signal is high, so the OR gate output is high, turning M1 off, and M4 is on, connecting the drain of $M_{DET}$ to ground. The laser sensing circuit (H1-H4, $M_{DET}$) is thus configured as in FIG. 19A.

Phase two is a test for damage phase in which a series of test pulses appear on Test_sig and are inverted by M2/M3. The nTest signal is low, so M4 is off and the OR gate passes the output of the M2/M3 inverter to the gate of M1. The output of the M2/M3 inverter also passes via H3 and H4 to the gate of $M_{DET}$. If $M_{DET}$ is undamaged, $M_{DET}$ and M1 act as an inverter and duplicate Test_sig at the Test_out port. If $M_{DET}$ is damaged, the Test_out signal will not reproduce Test_sig correctly.

A valid signal at Test_out reproducing the signal applied at Test_sig during the test for damage phase can thus be used to confirm that $M_{DET}$ is undamaged.

One drawback of the circuit 2100 illustrated in FIG. 21 is that the HV devices H3 and H4 serve a dual purpose; providing the pull-down current for the laser sensor during the sensing phase and passing the test signal to $M_{DET}$ during the test for damage phase. FIG. 22 illustrates an alternative circuit 2200 according to another embodiment in which the two functions are performed by separate pairs of HV FETs, allowing optimization for each function. This embodiment includes additional HV devices and two additional HV control signals (Test_hv and nTest_hv).

As before, the embodiment circuit illustrated in FIG. 22 operates in two phases. Phase one is a sense laser phase in which Test_hv is low, H5 is turned off, Node A is isolated from the M2/M3 inverter, nTest_hv is high, and H4 is on and acts as described above with reference to FIG. 19A. nTest signal is high so M4 is turned on, connecting the drain of $M_{DET}$ to ground. The laser sensing circuit (H1-H4, $M_{DET}$) is thus configured as in FIG. 19A.

Phase two is a test for damage phase in which Test_hv is high, H5 is turned on, the gate of $M_{DET}$ is connected to the M2/M3 inverter output, nTest_hv is low, and H4 is turned off, isolating Node A from ground. nTest signal is low so M4 is turned off. If $M_{DET}$ is undamaged, $M_{DET}$ and M1 act as an inverter and duplicate Test_sig at the Test_out port. If $M_{DET}$ is damaged, the Test_out signal will not reproduce Test_sig correctly.

As before, a valid signal at Test_out, reproducing the signal applied at Test_sig during the test for damage phase, can be used to confirm that $M_{DET}$ is undamaged.

Figure 23A:
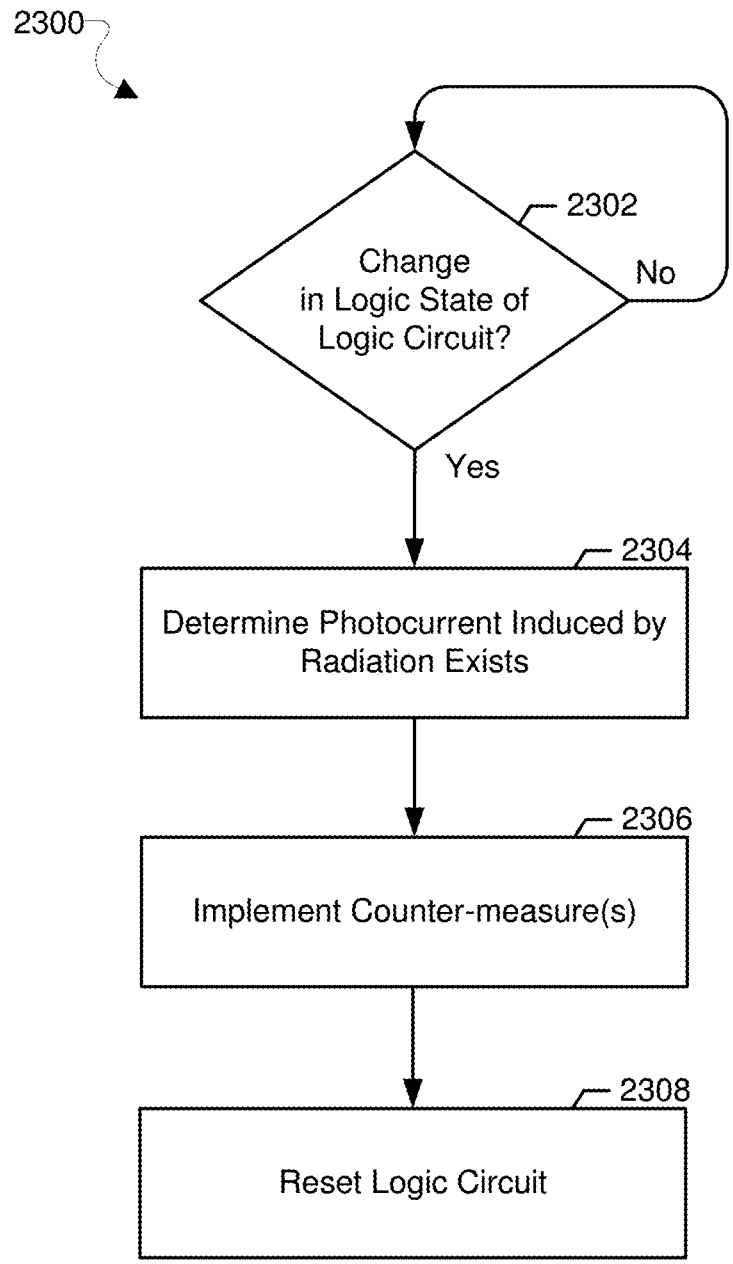
FIGS. 23A-23C are process flow diagrams illustrating methods for detection of laser-based security attacks according to various embodiments.

FIG. 23A illustrates a method 2300 for detecting a laser-based security attack by a circuit according to various embodiments. The method 2300 may be implemented in conjunction with one or more of the various embodiment circuits described above with reference to FIGS. 4-22.

In determination block 2302, a logic state of a logic circuit may be evaluated by a circuit to determine whether the logic state has changed. In various embodiments, any of the photocurrent detection circuits described above with reference to FIGS. 4-22 may be used in making this determination. In some embodiments, the logic circuit may include a photo-sensitive inverter. In some embodiments, the photo-sensitive inverter may include N-type metal-oxide-semiconductor (MOS) devices and P-type MOS devices. In some embodiments, the logic circuit may also include an inverting buffer. The circuit used to evaluate the logic state circuit may be any circuit of any embodiment described herein. In some embodiments, this determination may involve continuously or periodically sampling or testing the logic state or a logic state of the inverting buffer.

If a change in the logic state of the logic circuit does not occur (i.e., determination block 2302="No"), the method 2300 may continue to be performed in determination block 2302.

In response to determining that a change in the logic state of the logic circuit has occurred (i.e., determination block 2302="Yes"), a photocurrent induced by radiation is determined to exist in block 2304.

In response to determining that a photocurrent induced by radiation exists, one or more countermeasures may be implemented in block 2306. In some embodiments, a countermeasure may include securing the protected processor (e.g., a secure processor) to prevent readout of corrupted data. In some embodiments, one or more countermeasures may include actions conventionally implemented by circuitry in response to a voltage deviation, a high or low temperature condition, or a frequency deviation. In some embodiments, one or more countermeasures may include depowering or isolating a processor (e.g., a secure processor), blocking access to certain memory (e.g., secure memory, program memory, etc.), interrupting or depowering a MAC (e.g., a MAC controlling access to a secure memory, program memory, etc.), and the like. In some embodiments, one or more countermeasures may include disabling buffers in clock or data paths due to the photocurrent induced by radiation. Such one or more countermeasures may be permanent or temporary (e.g., resettable).

In block 2308, the logic circuit may be reset. In some embodiments, the logic circuit may be reset to pre-charge an output of an inverter to a logic high voltage.

Figure 23B:
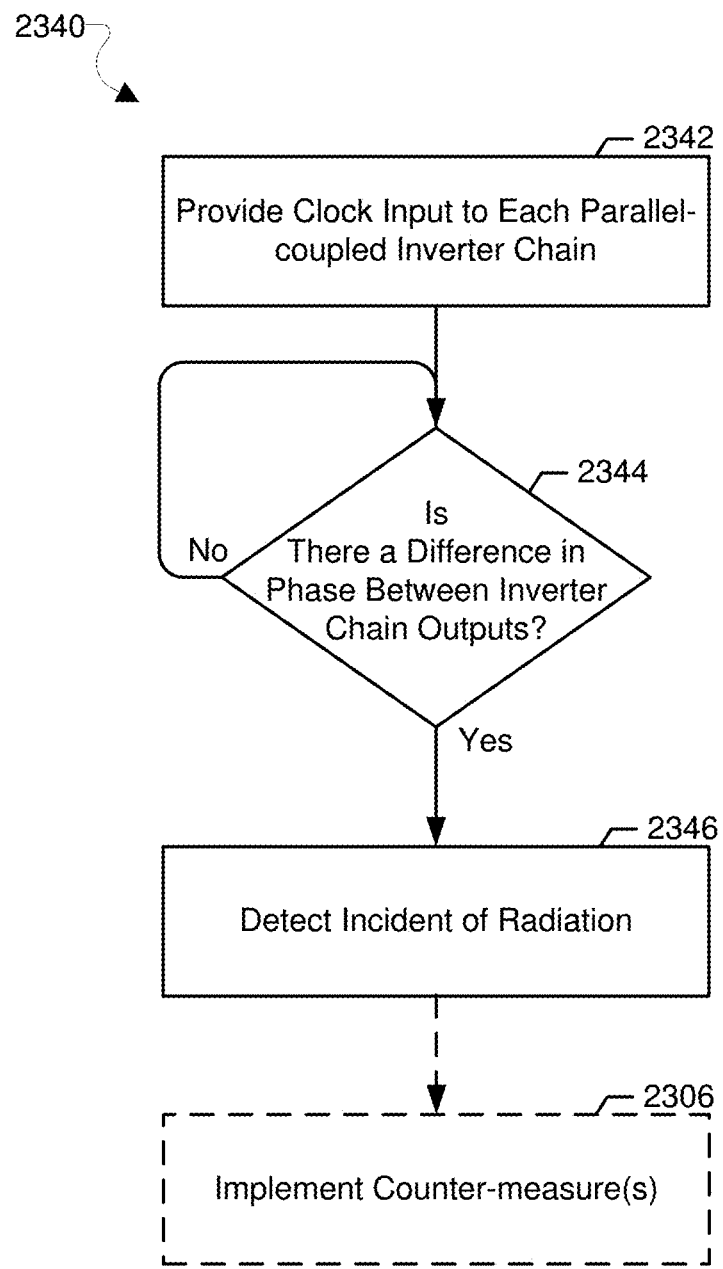

FIG. 23B illustrates a method 2340 for detecting a laser-based security attack by a circuit according to various embodiments. The method 2340 may be implemented in conjunction with one or more of the various embodiment circuits described above with reference to FIGS. 4-22.

With reference to FIG. 23B, in block 2342, a clock input may be provided to each of a plurality of inverter chains. In some embodiments, the inverter chains may be coupled in parallel. In some embodiments, each inverter chain may include a chain of inverters coupled in series.

In determination block 2344, a determination may be made whether there is difference in phase between outputs of the inverter chains. This determination may be made by a circuit configured to compare the phases of outputs of the inverter chains and trigger an output when a phase difference equaling or exceeding a threshold is detected. The determination may be made continuously or periodically while a difference in phase between outputs of the inverter chains is not detected (i.e., while determination block 2344="No").

In response to determining that there is a difference in phase between outputs of the inverter chains (i.e., determination block 2344="Yes"), an incident of radiation may be detected in block 2346.

In some embodiments, in response to determining that an incident of radiation is detected, one or more countermeasures may be implemented in block 2306 as described herein.

Figure 23C:
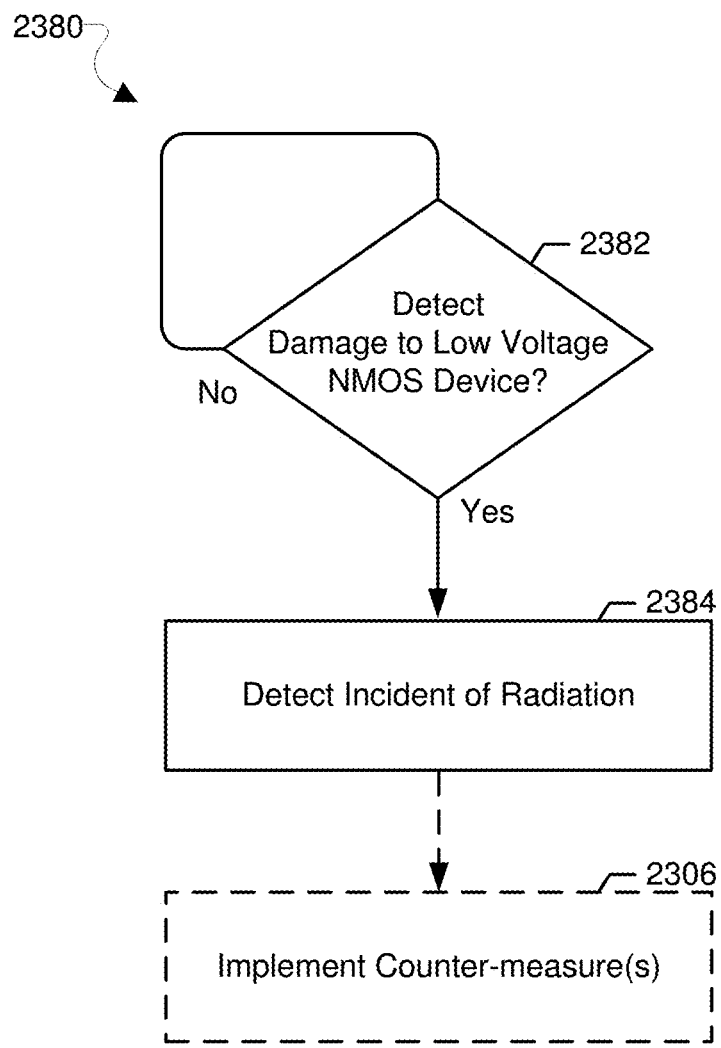

FIG. 23C illustrates a method 2380 for detecting a laser-based security attack by a circuit according to various embodiments. The method 2380 may be implemented in conjunction with one or more of the various embodiment circuits described above with reference to FIGS. 4-22.

In determination block 2382, a circuit may determine whether damage to a low voltage NMOS device is detected. The circuit may be any detection circuit described herein according to various embodiments. In various embodiments, a gate of the low voltage NMOS device may be coupled to an output of a logic circuit. In some embodiments, the logic circuit may include a PMOS device and a NMOS device. In some embodiments, the PMOS device may be a high voltage device and the NMOS device may be a low voltage device. In some embodiments, the PMOS device may be larger than the NMOS device.

In response to detecting damage to the low voltage NMOS device (i.e., determination block 2382="Yes"), an incident of radiation may be detected in block 2384. In response to detecting that no damage to the low voltage NMOS device has occurred (i.e., determination block 2382="No"), the circuit may feedback and continue to monitor for damage.

In some embodiments, in response to determining that an incident of radiation is detected, one or more countermeasures may be implemented in block 2306 as described herein.

Some embodiments illustrated in FIGS. 4-22 may involve variations of the process flows illustrated in FIGS. 23A-23C. Also, additional circuits may be used in some embodiments to generate a signal indicating that a potential attack has been detected, unlike the embodiment illustrated in FIG. 17 that just halts the processor when a photocurrent is detected.

Figure 24:
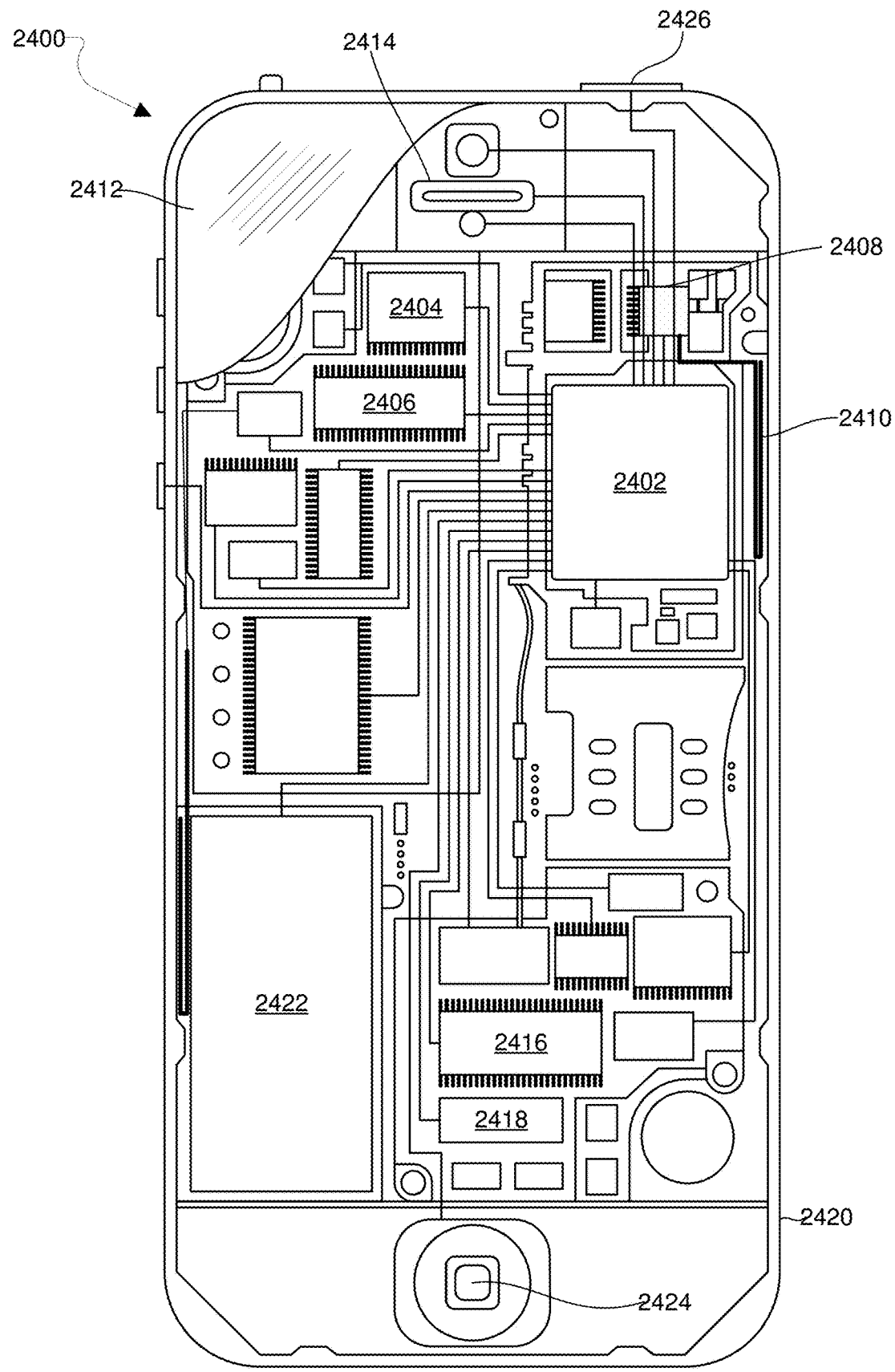
FIG. 24 is a component block diagram illustrating an example wireless communication device suitable for use with the various embodiments.

Circuits according to various embodiments (including, but not limited to, embodiments described above with reference to FIGS. 4-22) may be implemented in a wide variety of computing systems including wireless communication devices, an example of which suitable for use with the various embodiments is illustrated in FIG. 24. The wireless communication device 2400 may include a processor 2402 coupled to a touchscreen controller 2404 and an internal memory 2406. The processor 2402 may be one or more multicore integrated circuits designated for general or specific processing tasks. The internal memory 2406 may be volatile or non-volatile memory and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 2404 and the processor 2402 may also be coupled to a touchscreen panel 2412, such as a resistive-sensing touchscreen, capacitive-sensing touchscreen, infrared sensing touchscreen, etc. Additionally, the display of the computing device 2400 need not have touch screen capability.

The wireless communication device 2400 may have one or more radio signal transceivers 2408 (e.g., Peanut, Bluetooth, ZigBee, Wi-Fi, RF radio) and antennae 2410, for sending and receiving communications, coupled to each other and/or to the processor 2402. The transceivers 2408 and antennae 2410 may be used with the above-mentioned circuitry to implement the various wireless transmission protocol stacks and interfaces. The wireless communication device 2400 may include a cellular network wireless modem chip 2416 that enables communication via a cellular network and is coupled to the processor.

The wireless communication device 2400 may include a peripheral device connection interface 2418 coupled to the processor 2402. The peripheral device connection interface 2418 may be singularly configured to accept one type of connection, or may be configured to accept various types of physical and communication connections, common or proprietary, such as Universal Serial Bus (USB), FireWire, Thunderbolt, or PCIe. The peripheral device connection interface 2418 may also be coupled to a similarly configured peripheral device connection port (not shown).

The wireless communication device 2400 may also include speakers 2414 for providing audio outputs. The wireless communication device 2400 may also include a housing 2420, constructed of a plastic, metal, or a combination of materials, for containing all or some of the components described herein. The wireless communication device 2400 may include a power source 2422 coupled to the processor 2402, such as a disposable or rechargeable battery. The rechargeable battery may also be coupled to the peripheral device connection port to receive a charging current from a source external to the wireless communication device 2400. The wireless communication device 2400 may also include a physical button 2424 for receiving user inputs. The wireless communication device 2400 may also include a power button 2426 for turning the wireless communication device 2400 on and off.

Figure 25:
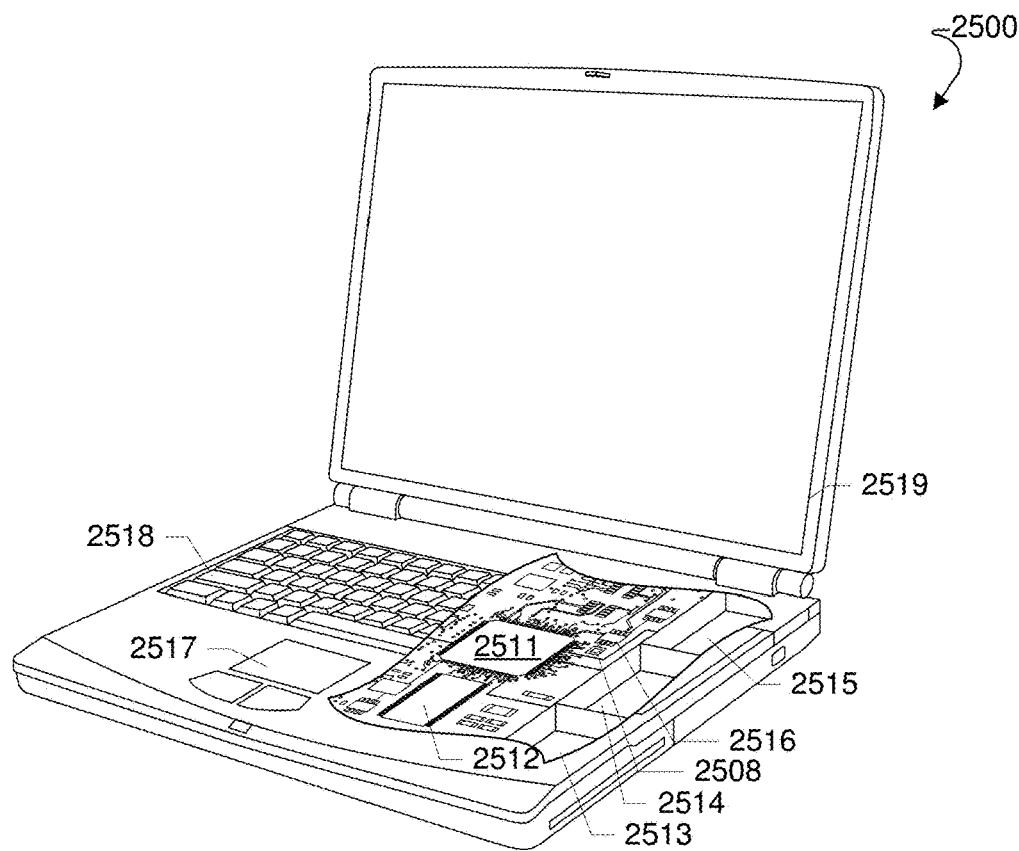
FIG. 25 is a component block diagram illustrating an example computing device suitable for use with the various embodiments.

Circuits according to various embodiments (including, but not limited to, embodiments described above with reference to FIGS. 1-23) may be implemented in a wide variety of computing devices include a laptop computer 2500 an example of which is illustrated in FIG. 25. Many laptop computers include a touchpad touch surface 2517 that serves as the computer's pointing device, and thus may receive drag, scroll, and flick gestures similar to those implemented on computing devices equipped with a touch screen display and described above. A laptop computer 2500 will typically include a processor 2511 coupled to volatile memory 2512 and a large capacity nonvolatile memory, such as a disk drive 2513 of Flash memory. Additionally, the computer 2500 may have one or more antenna 2508 for sending and receiving electromagnetic radiation that may be connected to a wireless data link and/or cellular telephone transceiver 2516 coupled to the processor 2511. The computer 2500 may also include a floppy disc drive 2514 and a compact disc (CD) drive 2515 coupled to the processor 2511. In a notebook configuration, the computer housing includes the touchpad 2517, the keyboard 2518, and the display 2519 all coupled to the processor 2511. Other configurations of the computing device may include a computer mouse or trackball coupled to the processor (e.g., via a USB input) as are well known, which may also be used in conjunction with the various embodiments.

Figure 26:
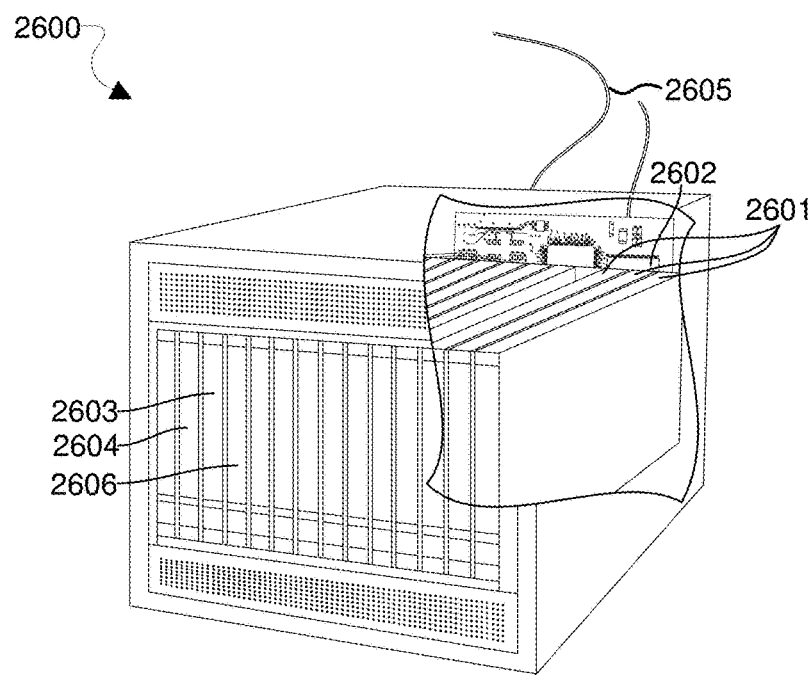
FIG. 26 is a component block diagram illustrating an example server suitable for use with the various embodiments.

Circuits according to various embodiments (including, but not limited to, embodiments described above with reference to FIGS. 1-23) may also be implemented in fixed computing systems, such as any of a variety of commercially available servers. An example server 2600 is illustrated in FIG. 26. Such a server 2600 typically includes one or more multicore processor assemblies 2601 coupled to volatile memory 2602 and a large capacity nonvolatile memory, such as a disk drive 2604. As illustrated in FIG. 26, multicore processor assemblies 2601 may be added to the server 2600 by inserting them into the racks of the assembly. The server 2600 may also include a floppy disc drive, compact disc (CD) or digital versatile disc (DVD) disc drive 2606 coupled to the processor 2601. The server 2600 may also include network access ports 2603 coupled to the multicore processor assemblies 2601 for establishing network interface connections with a network 2605, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of detecting an incident of radiation on a photocurrent detection circuit, comprising:
    determining whether a change in logic state of a logic circuit occurs indicating that a photocurrent is induced on the photocurrent detection circuit by radiation, wherein the photocurrent detection circuit comprises:
        a first N-type metal-oxide-semiconductor (MOS) device electrically connected to a first P-type MOS device to form the logic circuit, wherein the logic circuit is an inverter; and
        an inverting buffer, wherein an input of the inverting buffer is coupled to an output of the inverter;
    determining that the photocurrent induced by radiation exists in response to determining that a change in the logic state of the logic circuit occurred; and
    performing a countermeasure in response to determining that the photocurrent induced by radiation exists, wherein the countermeasure comprises disabling buffers in clock or data paths due to the photocurrent induced by radiation.

2. The method of claim 1, further comprising:
    resetting the photocurrent detection circuit to pre-charge the output of the inverter to a logic high voltage, wherein detecting the change in logic state of the logic circuit comprises:
        detecting a change in an output of the inverting buffer.

3. The method of claim 1, wherein the photocurrent detection circuit further comprises:
    an additional NMOS device, wherein a gate of the additional NMOS device is coupled to a gate of the first NMOS device, a source of the additional NMOS device is coupled to an output of the inverter, and a drain of the additional NMOS device is coupled to ground.

4. The method of claim 3, further comprising:
    biasing the output of the logic circuit to a bias current such that the output of the logic circuit is a logic high voltage level in an absence of the incident of radiation.

5. The method of claim 3, wherein the photocurrent detection circuit further comprises:
    an additional PMOS device, wherein a gate of the additional PMOS device is coupled to a gate of the first PMOS device, a drain of the additional PMOS device is coupled to an output of the inverter, and a source of the additional PMOS device is coupled to logic high voltage.

6. The method of claim 5, further comprising:
    biasing the output of the logic circuit to a bias current such that the output of the logic circuit is a logic high voltage level in an absence of the incident of radiation.

* * * * *